United States Patent
Lawrence et al.

(10) Patent No.: US 12,138,617 B2
(45) Date of Patent: *Nov. 12, 2024

(54) SILICA-BASED PARTICLE WITH HYDROXY-TERMINATED PEG BONDING AND METHOXY-TERMINATED PEG SURFACE MODIFICATION

(71) Applicant: Waters Technologies Corporation, Milford, MA (US)

(72) Inventors: Nicole L. Lawrence, Stafford Springs, CT (US); Yeliz Tunc Sarisozen, Westford, MA (US); Darryl W. Brousmiche, Grafton, MA (US); Matthew A. Lauber, North Smithfield, RI (US)

(73) Assignee: Waters Technologies Corporation, Milford, MA (US)

( * ) Notice: Subject to any disclaimer, the term of this patent is extended or adjusted under 35 U.S.C. 154(b) by 529 days.

This patent is subject to a terminal disclaimer.

(21) Appl. No.: 17/477,347

(22) Filed: Sep. 16, 2021

(65) Prior Publication Data

US 2022/0080385 A1    Mar. 17, 2022

Related U.S. Application Data

(60) Provisional application No. 63/079,301, filed on Sep. 16, 2020.

(51) Int. Cl.
*B01J 20/289*    (2006.01)
*B01J 20/10*    (2006.01)
(Continued)

(52) U.S. Cl.
CPC .......... *B01J 20/289* (2013.01); *B01J 20/103* (2013.01); *B01J 20/262* (2013.01); *B01J 20/265* (2013.01);
(Continued)

(58) Field of Classification Search
CPC ....... B01D 15/34; B01J 20/103; B01J 20/262; B01J 20/265; B01J 20/28004;
(Continued)

(56) References Cited

U.S. PATENT DOCUMENTS

| 4,017,528 A | 4/1977 | Unger et al. |
|---|---|---|
| 5,861,110 A | 1/1999 | Chieng et al. |

(Continued)

FOREIGN PATENT DOCUMENTS

| WO | 200218929 A2 | 3/2002 | |
|---|---|---|---|
| WO | 2008103423 A1 | 8/2008 | |
| WO | WO-2019117586 A1 * | 6/2019 | ............ G01N 21/31 |

OTHER PUBLICATIONS

He et al. Biomaterials 2010, 31, 1085-1092 (Year: 2010).*

(Continued)

*Primary Examiner* — Samir Shah
*Assistant Examiner* — Jordan W Taylor
(74) *Attorney, Agent, or Firm* — WOMBLE BOND DICKINSON (US) LLP; Deborah M. Vernon; Scott R. Breining

(57) ABSTRACT

The present disclosure is directed to stationary phase materials for performing size exclusion chromatography. Embodiments of the present disclosure feature hydroxy-terminated polyethylene glycol surface modified silica particle stationary phase materials, which are optionally also methoxy-terminated polyethylene glycol surface modified.

17 Claims, 6 Drawing Sheets

(51) Int. Cl.
  *B01J 20/26* (2006.01)
  *B01J 20/28* (2006.01)
(52) U.S. Cl.
  CPC ... *B01J 20/28004* (2013.01); *B01J 20/28011* (2013.01); *B01J 20/28016* (2013.01); *B01J 20/28052* (2013.01); *B01J 20/28083* (2013.01); *B01J 20/28085* (2013.01); *B01J 2220/4806* (2013.01); *B01J 2220/54* (2013.01); *B01J 2220/58* (2013.01)
(58) Field of Classification Search
  CPC ............ B01J 20/28011; B01J 20/28016; B01J 20/28052; B01J 20/28078; B01J 20/28083; B01J 20/28085; B01J 20/286; B01J 20/289; B01J 20/3204; B01J 20/327; B01J 20/328; B01J 20/3282; B01J 2220/4806; B01J 2220/54; B01J 2220/58
  See application file for complete search history.

(56) References Cited

U.S. PATENT DOCUMENTS

| | | | |
|---|---|---|---|
| 6,528,167 | B2 | 3/2003 | O'Gara |
| 6,686,035 | B2 | 2/2004 | Jiang et al. |
| 7,175,913 | B2 | 2/2007 | O'Gara |
| 7,223,473 | B2 | 5/2007 | Jiang et al. |
| 7,501,495 | B2 | 3/2009 | Ejima et al. |
| 7,919,177 | B2 | 4/2011 | Jiang et al. |
| 10,618,920 | B2 * | 4/2020 | Chen ................... C07F 7/1804 |
| 2019/0091657 | A1 | 3/2019 | Lawrence et al. |

OTHER PUBLICATIONS

Björkegren et al. Journal of Colloid and Interface Science 2015, 452, 215-223 (Year: 2015).*
Lee et al. WO2019117586A1 English Translation (Year: 2019).*
cymitquimica.com 2-[Methoxy(polyethyleneoxy)6-9propyl]trimethoxysilane FactSheet searched prior to Sep. 16, 2020 (Year: 2020).*
Akbari et al. "Synthesis of poly(ethylene glycol) (PEG) grafted silica nanoparticles with a minimum adhesion of proteins via one-pot one-step method." Colloids and Surfaces A: Physiochemical and Engineering Aspects, 484 (2015), 206-215.
He et al. "The effect of PEGylation of mesoporous silica nanoparticles on nonspecific binding of serum proteins and cellular responses." Biomater. 31(6), 2010, 1085-1092.
International Search Report and Written Opinion issued in International Application No. PCT/US2021/050751 dated Jan. 21, 2022.
Bernhard et al. "Repelling and ordering: the influence of poly(ethylene glycol) on protein adsorption." Phys. Chem. Chem. Phys. 19(2017): 28182-28188.
Bouvier et al. "Advances in size-exclusion separations of proteins and polymers by UHPLC." TrAC. 63(2014): 85-94.
Chen et al. "In-depth structural characterization of Kadcyla® (ado-trastuzumab emtansine) and its biosimilar candidate." MABS. 8.7(2016): 1210-1223.
Chen et al. "Surface hydratiopn: Principles and applications toward low-fouling/nonfouling biomaterials." Polymer. 51.23(2010): 5283-5293.
Daley et al. "An "Iceberg" Coating Preserves Bulk Hydration Dynamics in Aqueous PEG Solutions." J. Phys. Chem. B. 121. 46(2017): 10574-10582.
Ejima et al. "Arginines as an effective additive in gel permeation chromatography." J. Chromatogr. A. 1094.1(2005): 49-55.
Goyon et al. "Comprehensive Study on the effects of sodium and potassium additives in size exclusion chroamtographic separations of protein biopharmaceuticals." J. Pharma. Biomed. Anal. 144(2017): 242-251.
Terskovits et al. "On the Structural Stability and Solvent Denaturation of Proteins." J. Biol. Chem. 245.10(1970): 2588-2598.
Hong et al. "Size-Exclusion Chromatography for the Analysis of Protein Biotherapeutics and Their Aggregates." J. Liquid Chromatogr. Related Tech. 35(2012): 2923-2950.
Ishibashi et al. "Is arginine a protein-denaturant?" Protein Expression Purfication. 42(2005): 1-6.
Oelmeier et al. "Molecular dynamics simulations on aqueous two-phase systems—Single PEG-molecules in solution." BMC Biophys. 5(2012): 14.
Sanchez-Cano et al. "Recent Developments in the Design of Non-Biofouling Coatings for Nanoparticles and Surfaces." Int. J. Mol. Sci. 21.3(2020): 1007.
Schneider et al. "Arginine and the Hofmeister Series: The Role of Ion-Ion Interactions in Protein Aggregation Suppression." J. Phys. Chem. B. 115.22(2011): 7447-7458.
Schure et al. "Size exclusion chromatography with superficially porous particles." J. Chromatogr. A. 1480(2017): 11-19.
Szleifer. "Protein Adsorption on Surfaces with Grafted Polymers: A Theoretical Approach." Biophys. J. 72(1997): 595-612.
Tischer et al. "L-Arginine hydrochloride increases the solubility of folded and unfolded recombinant plasminogen activator rPA." Protein Science. 19(2010): 1783-1795.
Vajda et al. "Size distribution analysis of influenze virus particles using size exclusion chromatography." J. Chromatogr. A. 1465(2016): 117-125.
Wyndham et al. "Characterization and Evaluation of C18 HPLC Stationary Phases Based on Ethyl-Bridged Hybrid Organic/Inorganic Particles." Anal. Chem. 75.24(2003): 6781-6788.
Yumioka et al. "Mobile phase containing arginine provides more reliable SEC condition for aggregation analysis." J. Pharm. Sci. 99.2(2010): 618-620.

* cited by examiner

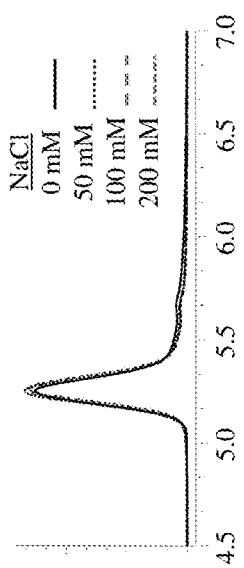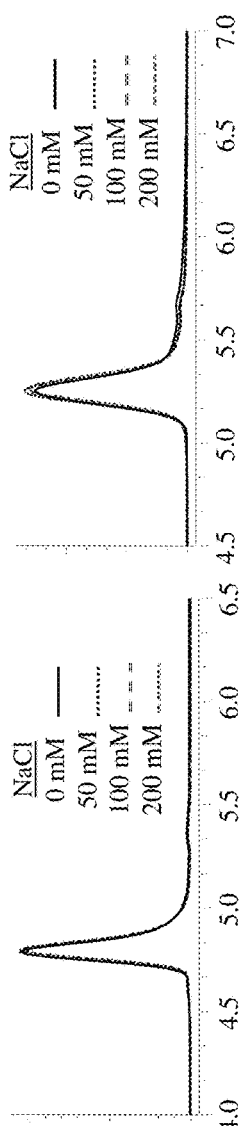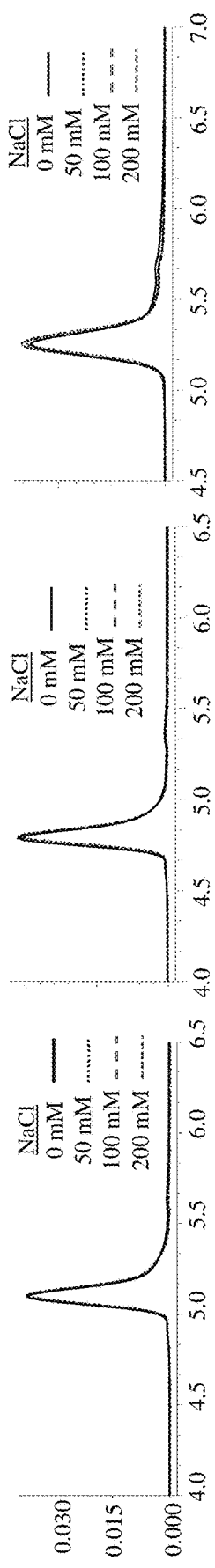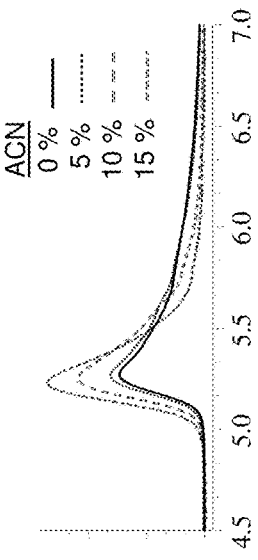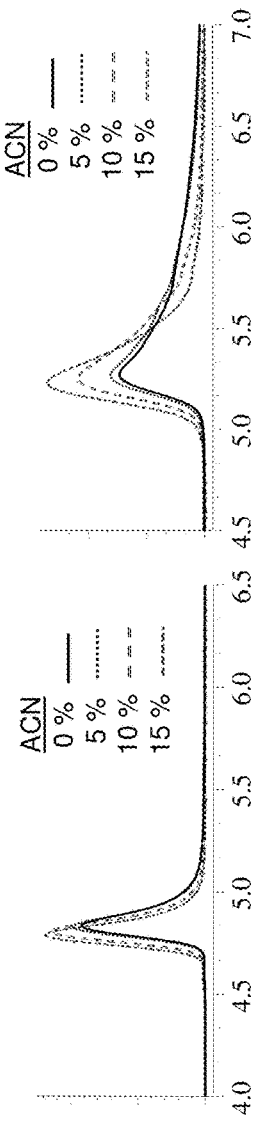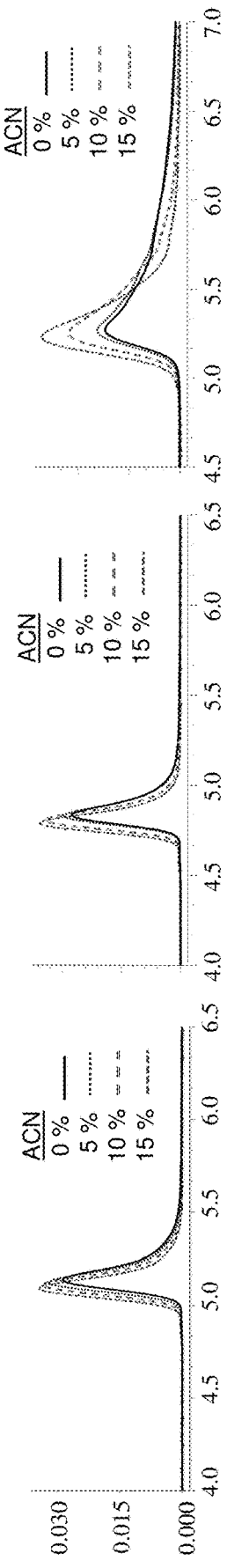

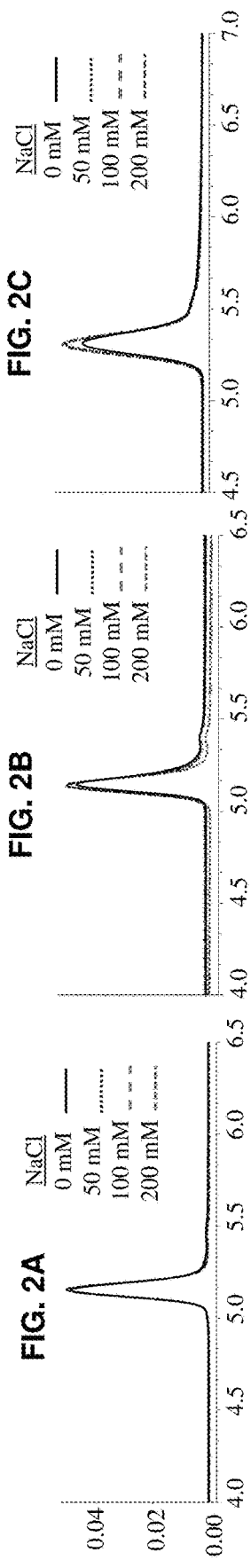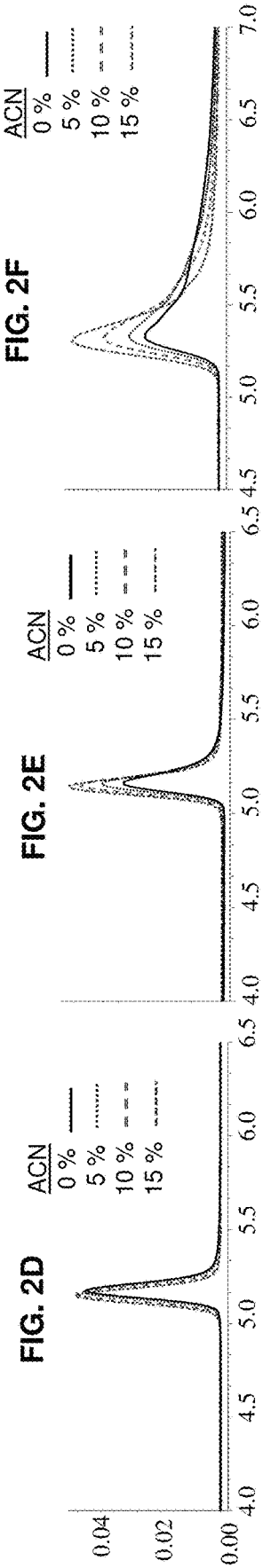

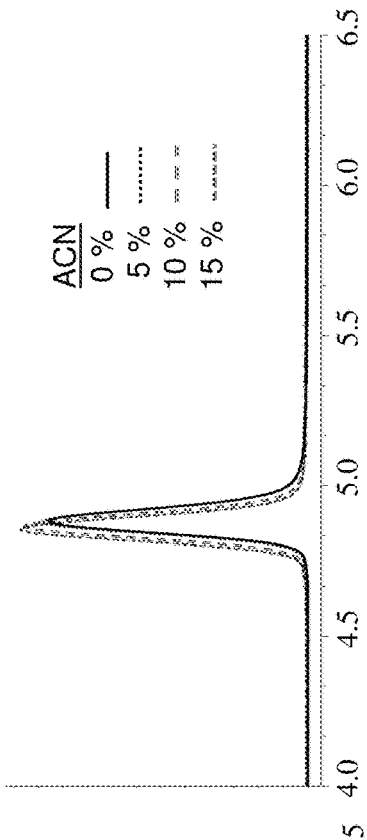
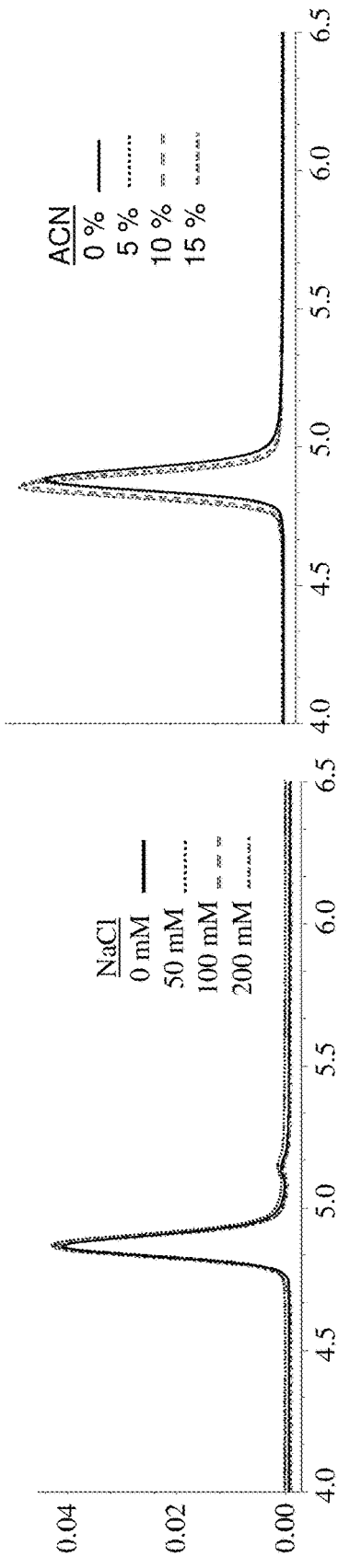
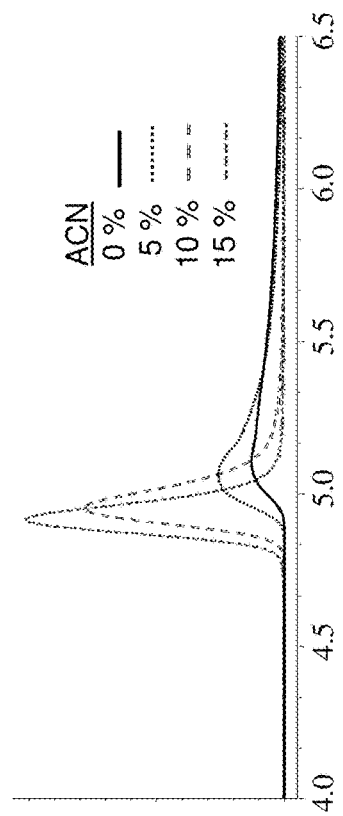
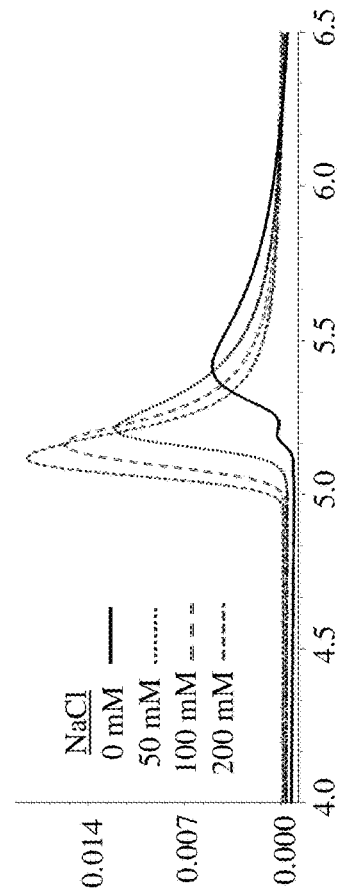
FIG. 4A
FIG. 4B
FIG. 4C
FIG. 4D

SILICA-BASED PARTICLE WITH HYDROXY-TERMINATED PEG BONDING AND METHOXY-TERMINATED PEG SURFACE MODIFICATION

CROSS-REFERENCE TO RELATED APPLICATIONS

This patent application claims the priority and benefit of U.S. Provisional Application No. 63/079,301 filed on Sep. 16, 2020 and entitled "Sorbent Used to Improve Chromatographic Separations in Size Exclusion Chromatography Via Reduced Secondary Interactions", which is herein incorporated by reference in its entirety.

TECHNICAL FIELD

The present disclosure relates to stationary phase materials for performing size exclusion chromatography. Particularly, the disclosure relates to stationary phase material comprising porous silica particles having hydroxy-terminated polyethylene glycol ligands on the particle surface. In some embodiments, the disclosure further relates to stationary phase material comprising porous silica particles having hydroxy-terminated ligands on the particle surface, and comprising methoxy-terminated polyethylene glycol ligands on the particle surface.

BACKGROUND

Size exclusion chromatography (SEC) is a common separation technique that employs differences in hydrodynamic radii to separate solubilized analytes on an immobilized stationary phase. In theory, perfect SEC separates exclusively based on the hydrodynamic radii; however, secondary interactions, such as ionic and hydrophobic interactions, can cause undesired effects including peak broadening, tailing, and loss of resolution and separation efficiency. For separations of biopharmaceutical materials, such as monoclonal antibodies, antibody drug conjugates, or fusion proteins, these secondary interactions result in a significant analytical challenge. Traditional approaches to reduce these secondary interactions include the addition of salts, such as sodium or potassium chloride, or the inclusion of organic co-solvents, such as methanol, ethanol, isopropanol, or acetonitrile. However, there is no universal solution for all target analytes, and each desired separation requires optimization of mobile phase components. Mobile phase optimization is generally tedious, time consuming, and lacks ease of use for novice users.

Polar surface modifications are introduced onto the stationary phases used in SEC in order to minimize non-specific secondary interactions, providing high efficiency and the ability to remain unaffected by variations in method parameters. The commonly used surface modifications are diol and polyethylene glycol-based bondings and coatings. While these surface modifications can reduce secondary interactions for size exclusion separations, they have their own drawbacks. The major drawback of diol-bonded/coated surfaces is the continued existence of hydrophobic secondary interactions and the related requirement of mobile phase development.

Surface modification with polyethylene glycols (PEGs), also referred to as polyethylene oxides (PEOs), is another common strategy used to reduce non-specific interactions, and such modified materials have been incorporated into many different products and platforms. This ubiquity is partially due to performance and partly due to facile manipulation of the strategy. PEGs are amenable to both two- and three-dimensional situations, affording coverage of material such as porous particles used in SEC. PEGs create a hydration layer that works to repel non-specific interactions, including both ionic and hydrophobic. They provide a more effective resistance against non-specific secondary interactions compared to diol-bonded surfaces. On the other hand, when used alone, methoxy-terminated PEG bonding, the most common surface modification, can cause poor peak shape and low efficiency in SEC separations.

SUMMARY

The present disclosure is generally directed to stationary phase materials for performing size exclusion chromatography. In general, the stationary phase materials have been surface modified with a polyethylene glycol (PEG), and are hydroxy-terminated. Surprisingly, according to the present disclosure, it has been found that hydroxy-terminated polyethylene glycol surface modified particles provide SEC separations with reduced analyte secondary interactions, and a reduced dependence on buffers, pHs, and column temperatures. Further, it has been surprisingly found according to the present disclosure that, in contrast to stationary phase materials modified only with methoxy-terminated PEG groups, stationary phase materials modified with a hydroxy-terminated PEG bonding and further modified with methoxy-terminated PEG groups, the presence of the methoxy-terminated PEG groups does not result in poor peak shape, and in fact considerably increases the stability of the stationary phase material to basic conditions. Particularly, the combination of hydroxy-terminated PEG and methoxy-terminated PEG groups on the particle surface provides SEC separations with reduced analyte secondary interactions, a reduced dependence on buffers, pH, and column temperatures, and provides increased overall chemical stability of the stationary phase material, all without sacrificing peak shape or efficiency. The combination of hydroxy- and methoxy-terminated PEG groups on the silica surface may be particularly useful when stationary phase materials may be subjected to high pH conditions (e.g. pH above about 8).

In one aspect is provided a stationary phase material comprising porous particles having a surface, at least some substantial portion thereof modified with a hydroxy-terminated polyethylene glycol (PEG), wherein the porous particles comprise silica. Further, the stationary phase may be additionally modified with methoxy-terminated PEG. These stationary phase materials can be used for size exclusion chromatography.

Accordingly, in another aspect is provided a stationary phase material comprising porous silica particles having a surface, wherein at least some substantial portion thereof is modified with a hydroxy-terminated polyethylene glycol (PEG), and at least a portion of the surface thereof is modified with a methoxy-terminated polyethylene glycol. These stationary phase materials can be used for size exclusion chromatography.

Embodiments of one or more of the above aspects may include one or more of the following features.

In some embodiments, the porous silica particles have a diameter with a mean size distribution from about 1 to about 50 μm. In some embodiments, the porous silica particles have a diameter with a mean size distribution from about 1 to about 20 μm. In some embodiments, the porous silica particles have a diameter with a mean size distribution from about 1.5 to about 5 μm.

In some embodiments, the porous silica particles have an average pore size from about 0 to about 3000 Å, from about 1000 to about 3000 Å, or from about 1000 to about 2000 Å.

In some embodiments, the hydroxy-terminated polyethylene glycol has a formula

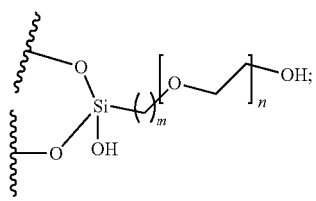

wherein:
m is an integer from about 1 to about 10;
n is an integer from about 2 to about 50; and
wherein the wavy lines indicate points of attachment to the surface of the porous silica particles.

In some embodiments, m is 2 or 3. In some embodiments, n is from about 5 to about 15, or from about 8 to about 12. In some embodiments, m is 3 and n is from about 8 to about 12. In some embodiments, the hydroxy-terminated polyethylene glycol is present on the surface of the porous silica particles at a density from about 0.5 to about 15 μmol/m². In some embodiments, the hydroxy-terminated polyethylene glycol is present on the surface of the porous silica particles at a density from about 0.5 to about 5.0 μmol/m², or from about 1.0 to about 2.0 μmol/m².

In some embodiments, the portion of the surface modified with the methoxy-terminated polyethylene glycol is the result of treatment of the stationary phase material with a methoxy-terminated polyethylene glycol reagent having a formula:

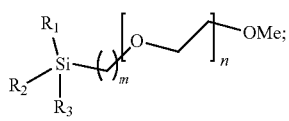

wherein:
at least one of $R_1$, $R_2$, and $R_3$ is OMe, OEt, Cl, or $N(CH_3)_2$;
m is an integer from about 1 to about 10; and
n is an integer from about 2 to about 20.

In some embodiments, m is 1, 2, 3, 4, 5, 6, 7, 8, 9, or 10. In some embodiments, m is 2 or 3. In some embodiments, m is 3 (i.e., propyl).

In some embodiments, n is from about 5 to about 15. In some embodiments, n is from about 6 to about 12, such as from about 6 to about 9.

In some embodiments, the methoxy-terminated PEG reagent is 2-[methoxy(polyethyleneoxy)$_{6-9}$propyl]trichlorosilane or 2-[methoxy(polyethyleneoxy)$_{6-9}$propyl]tris(dimethylamino)silane.

In some embodiments, at least a portion of the surface of the porous silica particles, modified with the hydroxy-terminated polyethylene glycol and the methoxy-terminated polyethylene glycol reagent, comprises a structure represented by one of formulae:

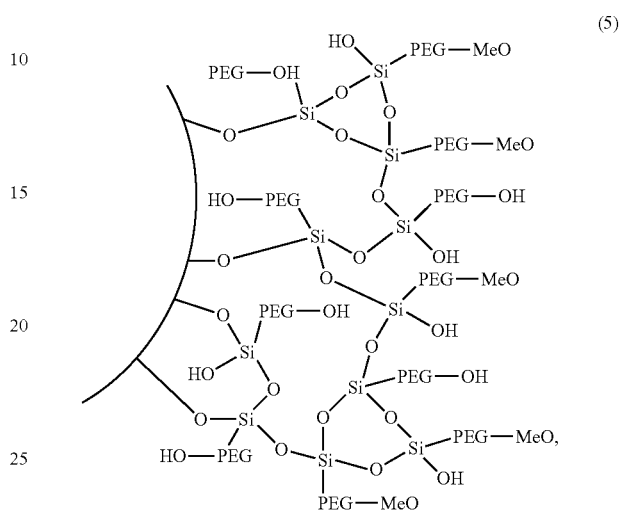

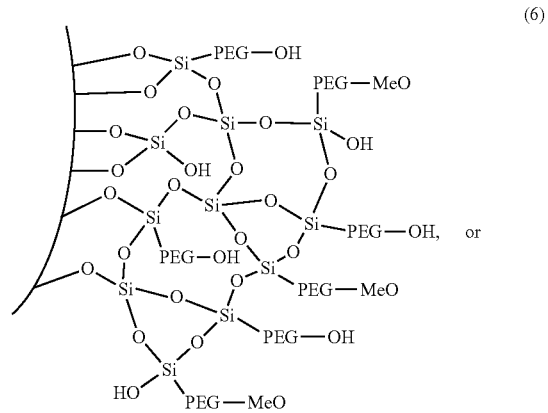

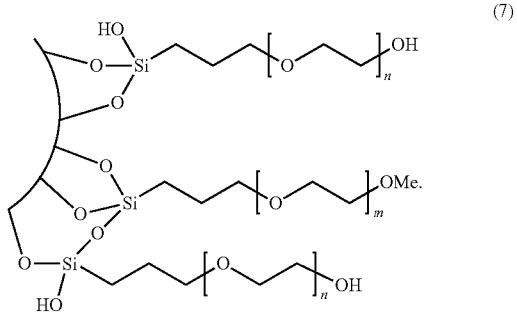

In some embodiments, at least a portion of the surface of the porous silica particles, modified with the hydroxy-terminated polyethylene glycol and the methoxy-terminated polyethylene glycol reagent, comprises a structure represented by the formula:

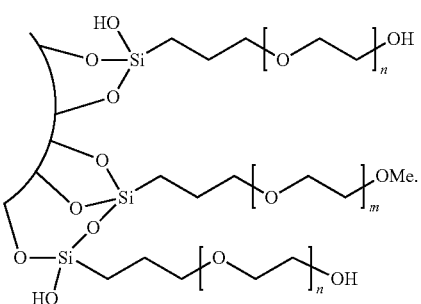

(7)

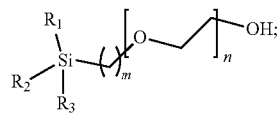

wherein:
at least one of $R_1$, $R_2$, and $R_3$ is OMe, OEt, Cl, or $N(CH_3)_2$;
m is an integer from about 1 to about 10; and
n is an integer from about 2 to about 50, to form a reaction mixture; and
treating the reaction mixture with an aqueous hydrolysis solution to surface modify at least some substantial portion of the surface of the porous silica particles.

In some embodiments, $R_1$, $R_2$, and $R_3$ are each OMe, OEt, Cl, or $N(CH_3)_2$. In some embodiments, $R_1$, $R_2$, and $R_3$ are each OMe or are each OEt, and wherein contacting further comprises adding a catalyst to the reaction mixture.

In some embodiments, the catalyst is hydrochloric acid (HCl).

In some embodiments, the hydroxy-terminated polyethylene glycol is present on the surface of the porous silica particles at a density from about 0.5 to about 15 μmol/m². In some embodiments, the hydroxy-terminated polyethylene glycol is present on the surface of the porous silica particles at a density from about 0.5 to about 5.0 μmol/m², or from about 1.0 to about 2.0 μmol/m².

In some embodiments, the method further comprises contacting the hydroxy-terminated polyethylene glycol modified stationary phase material with a non-hydroxy-terminated polyethylene glycol reagent. In some embodiments, the non-hydroxy-terminated polyethylene glycol reagent is a methoxy-terminated polyethylene glycol silane reagent. In some embodiments, the methoxy-terminated polyethylene glycol silane reagent has a formula

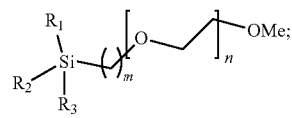

In another aspect is provided a column comprising the stationary phase material as described herein, the column having an interior for accepting the stationary phase material.

In some embodiments, as compared to a reference column having a stationary phase comprising porous silica particles which do not have a hydroxy-terminated polyethylene glycol modified surface, the column provides one or more of:
a reduction in ionic secondary interactions of analytes with the stationary phase material in SEC separations performed on said column;
a reduction in hydrophobic secondary interactions of analytes with the stationary phase material in SEC separations performed on said column;
a reduced dependence on mobile phase pH in SEC separations performed on said column;
a reduced dependence on column temperature in SEC separations performed on said column;
wherein said reductions are determined by an improvement in peak shape as calculated from USP Peak Tailing, Asymmetry @ 4.4, Peak Width @ 50%, or a combination thereof.

In some embodiments, as compared to a reference column having a stationary phase comprising porous silica particles which do not have a hydroxy-terminated polyethylene glycol modified surface, the column provides enhanced peak resolution in SEC separations performed on said column; enhanced reproducibility of SEC separations performed on said column; or both.

In some embodiments, the column comprises a stationary phase material comprising porous silica particles having a surface, at least some substantial portion thereof modified with a hydroxy-terminated polyethylene glycol (PEG), and wherein at least a portion of the surface is modified with a methoxy-terminated polyethylene glycol, and, as compared to a column having a stationary phase comprising porous silica particles having only a hydroxy-terminated polyethylene glycol modified surface, the column provides enhanced stability toward an alkaline condition.

In some embodiments, the alkaline condition is a pH above about 8. In some embodiments, the alkaline condition is a pH from about 8 to about 9.

In a still further aspect is provided a method of preparing a stationary phase material for size exclusion chromatography, the stationary phase having a surface, at least some substantial portion thereof modified with a hydroxy-terminated polyethylene glycol, the method comprising: providing a stationary phase material comprising porous particles comprising silica; contacting the stationary phase material with a hydroxy-terminated polyethylene glycol reagent having the formula wherein:
at least one of $R_1$, $R_2$, and $R_3$ is OMe, OEt, Cl, or $N(CH_3)_2$;
m is an integer from about 1 to about 10; and
n is an integer from about 2 to about 20.

In some embodiments, m is 1, 2, 3, 4, 5, 6, 7, 8, 9, or 10. In some embodiments, m is 2 or 3. In some embodiments, m is 3 (i.e., propyl).

In some embodiments, n is from about 5 to about 15. In some embodiments, n is from about 6 to about 12, such as from about 6 to about 9.

In some embodiments, the methoxy-terminated PEG silane is 2-[methoxy(polyethyleneoxy)$_{6-9}$propyl]trichlorosilane or 2-[methoxy(polyethyleneoxy)$_{6-9}$propyl]tris(dimethylamino)silane.

In yet another aspect, the technology is directed to a method of forming a stationary phase material. The method comprises: providing a stationary phase material comprising porous particles comprising silica; contacting the stationary phase material with a hydroxy-terminated polyethylene glycol reagent; treating the reaction mixture with an aqueous hydrolysis solution to surface modify the porous silica particles; and further treating the stationary phase material with a methoxy-terminated polyethylene glycol reagent.

A further aspect of the present technology is directed to a stationary phase material for size exclusion chromatography that is produced from the above method (e.g., contacting with a hydroxy-terminated polyethylene glycol reagent; treating with an aqueous hydrolysis solution; and further treating with a methoxy-terminated polyethylene glycol reagent). In some embodiments, the stationary phase particles are produced using the above method, in which contacting with a hydroxy-terminated polyethylene glycol reagent and treating with an aqueous hydrolysis solution is repeated/conducted for a time period sufficient to build up one or more layers of a coating (i.e., a hydroxy-terminated PEG coating) prior to treating (e.g., bonding) with a methoxy-terminated polyethylene glycol reagent.

The above aspects, features, and embodiments are further described in connection with the figures and examples provided below.

BRIEF DESCRIPTION OF THE DRAWINGS

In order to provide an understanding of embodiments of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

FIG. 1A depicts exemplary chromatographic separations of NISTmAb on a prototype hydroxy-terminated PEG surface modified 1000 Å silica SEC column, with a mobile phase comprising aqueous sodium phosphate buffer and varying concentrations of sodium chloride.

FIG. 1B depicts exemplary chromatographic separations of NISTmAb on a reference BTEE/TEOS coated/hydroxy-terminated PEG bonded 1000 Å silica SEC column, with a mobile phase comprising aqueous sodium phosphate buffer and varying concentrations of sodium chloride.

FIG. 1C depicts exemplary chromatographic separations of NISTmAb on a reference 1000 Å silica SEC column, with a mobile phase comprising aqueous sodium phosphate buffer and varying concentrations of sodium chloride.

FIG. 1D depicts exemplary chromatographic separations of Trastuzumab emtansine (Kadcyla; Genentech) on a prototype hydroxy-terminated PEG surface modified 1000 Å silica SEC column, with a mobile phase comprising aqueous sodium phosphate buffer and varying concentrations of acetonitrile.

FIG. 1E depicts exemplary chromatographic separations of Trastuzumab emtansine (Kadcyla; Genentech) on a reference BTEE/TEOS coated/hydroxyl-terminated PEG bonded 1000 A silica SEC column, with a mobile phase comprising aqueous sodium phosphate buffer and varying concentrations of acetonitrile.

FIG. 1F depicts exemplary chromatographic separations of Trastuzumab emtansine (Kadcyla; Genentech) on a reference 1000 Å silica SEC column, with a mobile phase comprising aqueous sodium phosphate buffer and varying concentrations of acetonitrile.

FIG. 2A depicts exemplary chromatographic separations of NISTmAb on a prototype hydroxy-terminated PEG surface modified 2000 Å silica SEC column, with a mobile phase comprising aqueous sodium phosphate buffer and varying concentrations of sodium chloride.

FIG. 2B depicts exemplary chromatographic separations of NISTmAb on a reference methoxy-terminated PEG surface modified 2000 Å silica SEC column, with a mobile phase comprising aqueous sodium phosphate buffer and varying concentrations of sodium chloride.

FIG. 2C depicts exemplary chromatographic separations of NISTmAb on a reference 2000 Å silica SEC column, with a mobile phase comprising aqueous sodium phosphate buffer and varying concentrations of sodium chloride.

FIG. 2D depicts exemplary chromatographic separations of Trastuzumab emtansine (Kadcyla; Genentech) on a prototype hydroxy-terminated PEG surface modified 2000 Å silica SEC column, with a mobile phase comprising aqueous sodium phosphate buffer and varying concentrations of acetonitrile.

FIG. 2E depicts exemplary chromatographic separations of Trastuzumab emtansine (Kadcyla; Genentech) on a reference methoxy-terminated PEG surface modified 2000 Å silica SEC column, with a mobile phase comprising aqueous sodium phosphate buffer and varying concentrations of acetonitrile.

FIG. 2F depicts exemplary chromatographic separations of Trastuzumab emtansine (Kadcyla; Genentech) on a reference 2000 Å silica SEC column, with a mobile phase comprising aqueous sodium phosphate buffer and varying concentrations of acetonitrile.

FIG. 4A depicts exemplary chromatographic separations of NISTmAb on a reference BTEE/TEOS coated/hydroxy-terminated PEG bonded 2000 Å silica SEC column, with a mobile phase comprising aqueous sodium phosphate buffer and varying concentrations of sodium chloride.

FIG. 4B depicts exemplary chromatographic separations of Trastuzumab emtansine (Kadcyla; Genentech) on a reference BTEE/TEOS coated/hydroxy-terminated PEG bonded 2000 Å silica SEC column, with a mobile phase comprising aqueous sodium phosphate buffer and varying concentrations of acetonitrile.

FIG. 4C depicts exemplary chromatographic separations of NISTmAb on a reference BTEE/TEOS coated/hydroxy-terminated PEG bonded 2000 Å silica SEC column after high pH application, with a mobile phase comprising aqueous sodium phosphate buffer and varying concentrations of sodium chloride.

FIG. 4D depicts exemplary chromatographic separations of Trastuzumab emtansine (Kadcyla; Genentech) on a reference BTEE/TEOS coated/hydroxy-terminated PEG bonded 2000 Å silica SEC column after high pH application, with a mobile phase comprising aqueous sodium phosphate buffer and varying concentrations of acetonitrile.

DETAILED DESCRIPTION

Figure 3A:
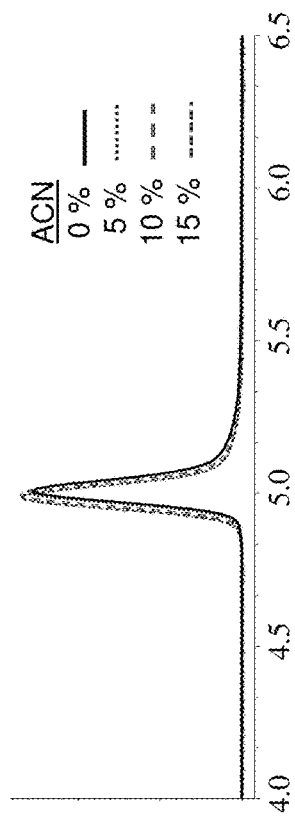
FIG. 3A depicts exemplary chromatographic separations of NISTmAb on a prototype hydroxy-terminated polyethylene glycol (PEG) surface modified 2000 Å silica particle SEC column, with a mobile phase comprising aqueous sodium phosphate buffer and varying concentrations of sodium chloride.

Before describing several example embodiments of the technology, it is to be understood that the technology is not limited to the details of construction or process steps set forth in the following description. The technology is capable of other embodiments and of being practiced or being carried out in various ways.

Definitions

With respect to the terms used in this disclosure, the following definitions are provided. This application will use the following terms as defined below unless the context of the text in which the term appears requires a different meaning The articles "a" and "an" are used herein to refer to one or to more than one (i.e., to at least one) of the grammatical object of the article. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

Chromatography is a separation method for concentrating or isolating one or more compounds (e.g., biomolecules) found in a mixture. The compounds (e.g., biomolecules) are normally present in a sample. This disclosure uses the term "sample" broadly to represent any mixture which an individual may desire to analyze. The term "mixture" is used in the sense of a fluid containing one or more dissolved compounds (e.g., biomolecules). A compound of interest present in said sample is referred to as an analyte.

Chromatography is a differential migration process. Compounds in a mixture traverse a chromatographic column at different rates, leading to their separation. The migration occurs by convection of a fluid phase, referred to as the mobile phase, in relationship to a packed bed of particles or a porous monolith structure, referred to as the stationary phase. In some modes of chromatography, differential migration occurs by differences in affinity of analytes with the stationary phase and mobile phase.

Size exclusion chromatography (SEC) is a type of chromatography in which the analytes in a mixture are separated or isolated on the basis of hydrodynamic radius. In SEC, separation occurs because of the differences in the ability of analytes to probe the volume of the porous stationary phase media. See, for example, A. M. Striegel et. al. *Modern Size-Exclusion Chromatography: Practice of Gel Permeation and Gel Filtration Chromatography,* 2nd Edition, Wiley, NJ, 2009. SEC is typically used for the separation of large molecules or complexes of molecules. For example, without limitation, many large molecules of biological origin ("biomolecules"), such as deoxyribonucleic acids (DNAs), ribonucleic acids (RNAs), proteins, polysaccharides, antibody-drug conjugates, and fragments and complexes of any thereof are analyzed by SEC. Synthetic polymers, plastics, and the like are also analyzed by SEC.

SEC is normally performed using a column having a packed bed of particles. The packed bed of particles is a separation media or stationary phase through which the mobile phase will flow. The column is placed in fluid communication with a pump and a sample injector. The sample is loaded onto the column under pressure by the sample injector and the sample components and mobile phase are pushed through the column by the pump. The components in the sample leave or elute from the column with the largest molecules (largest hydrodynamic radius) exiting first and the smallest molecules leaving last.

The column is placed in fluid communication with a detector, which can detect the change in the nature of the mobile phase as the mobile phase exits the column. The detector will register and record these changes as a plot, referred to as a chromatogram, which is used to determine the presence or absence of the analyte, and, in some embodiments, the concentration thereof. The time at which the analyte leaves the column (retention time) is an indication of the size of the molecule. Molecular weight of the molecules can be estimated using standard calibration curves. Examples of detectors used for SEC are, without limitation, refractive index detectors, UV detectors, light-scattering detectors, and mass spectrometers.

"Hybrid", including "inorganic-organic hybrid material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium or oxides thereof, or ceramic material. "Hybrid" includes inorganic-based structures wherein an organic functionality is integral to both the internal or "skeletal" inorganic structure as well as the hybrid material surface. Exemplary hybrid materials are shown in U.S. Pat. Nos. 4,017,528, 6,528,167, 6,686,035, and 7,175,913, each of which is incorporated by reference herein in its entirety. One non-limiting example of an inorganic-organic hybrid material is an ethylene-bridged hybrid material having an empirical formula of $SiO_2(O_{1.5}SiCH_2CH_2SiO_{1.5})_{0.25}$.

The terms "polyethylene glycol" and "polyethylene oxide" are used synonymously herein, both terms referring to oligomeric or polymeric polyether compounds having the formula —$(O—CH_2CH_2)_n$—OH. Accordingly, the abbreviations for "polyethylene glycol" and "polyethylene oxide", "PEG" and "PEO", respectively, are used synonymously herein.

The term "methoxy-terminated polyethylene glycol", abbreviated herein as "MeO-PEO" or MeO-PEG", refers to oligomeric or polymeric polyether compounds having the formula —$(O—CH_2CH_2)_n$—OMe. In contrast to hydroxy-terminated polyethylene glycols (HO-PEGs), MeO-PEGs do not have a free hydroxyl (OH) group available, having been terminated with a methyl group.

The term "surface modification" as used herein, refers to the process of modifying the surface of a material by changing physical and/or chemical characteristics of the surface to improve the properties. The term "surface modified" as used herein, refers to a material (e.g., a porous stationary phase particle or core material) which has been reacted with a surface modifying group (a "surface modifier") to covalently bond, non-covalently bond, adsorb, or otherwise attach the surface modifier to the surface of the core material, or the surface of the stationary phase material. In certain embodiments, the surface modifying group is attached to the surface of the material by a siloxane bond. For example, the surface of a silica or hybrid silica material contains silanol groups, which can be reacted with one or more reactive organosilane reagents (e.g., halo or alkoxy substituted silanes), thus producing Si—O—Si—C linkages. The surface modification can be a bonded surface or a coated surface.

The term "bonded surface" refers to a material (e.g., a porous stationary phase particle or core material) which predominantly has a monolayer of covalently attached silane molecules as a result of a bonding reaction between the surface modifying group and available hydroxyl groups on the surface of the material.

The term "coated surface" refers to a material (e.g., a porous stationary phase particle or core material) which has multilayers of the surface modifying group(s) due to oligomer and polymer formation of the surface modifying group(s) and horizontal and vertical polymerization reactions on the surface of the material.

The phrase "at least some substantial portion" as used herein to describe the extent of modification (i.e., bonding or coating), means that the surface density of the modification (e.g., a hydroxy-terminated polyethylene glycol) on the surface of the stationary phase particles is a minimum of about 0.5 micromole per square meter of particle surface area (0.5 $\mu$mol/m$^2$). Surface density of the modification may be determined by calculating the difference in % carbon of the particle before and after the surface modification, as measured by elemental analysis. Surface density as reported herein is determined according to this calculation.

Reference herein to the "surface" of the stationary phase particles is, unless otherwise indicated or contradicted by the context, intended to mean the outermost extent of the particle surface.

Embodiments of the present disclosure are now described in detail with the understanding that such embodiments are exemplary only. Such embodiments constitute what the inventors now believe to be the best mode of practicing the technology. Those skilled in the art will recognize that such embodiments are capable of modification and alteration.

Stationary Phase Material

Size exclusion chromatography (SEC) is performed on a stationary phase material with a size-based affinity for the analyte. An ideal SEC separation would separate exclusively on the size of the analyte molecule; however, non-specific secondary interactions of the analyte with the stationary phase reduce separation efficiency and reduce the quality of the separation. The most common secondary interactions are ionic and hydrophobic interactions, both of which result in poor chromatographic performance, including peak broadening, peak tailing, and loss of resolution and separation efficiency.

At least two types of ionic interactions may occur. When a protein analyte and the stationary phase carry the same charge, ion-exclusion takes place due to electrostatic repulsion (decrease in protein elution time). When the protein and the stationary phase carry an opposite charge, ion-exchange takes place (increase in elution time). To ameliorate the ionic properties of the stationary phase surface, it is common practice to derivative the stationary phase material (e.g., silica or inorganic-organic hybrid particles) with hydrophobic silanes. The increase of hydrophobicity of the particle decreases the ionic interactions, but can introduce additional hydrophobic interactions.

Antibody-drug conjugates (ADCs) often have increased hydrophobicity compared to unmodified proteins due to their payload conjugations, which can interact with the hydrophobic regions of a modified particle, resulting in poor quality separation. Surface modifications (e.g., diol bonding, polyethylene glycol (PEG)-based bonding) may ameliorate to varying degrees such interactions. While these surface modifications can reduce secondary interactions for size exclusion separations, they have their own drawbacks. The major drawback of diol-bonded/coated surfaces is the continued existence of hydrophobic secondary interactions and the related requirement for complex mobile phase development.

Current PEG-based modifications, such as methoxy-terminated polyethylene glycol bonding (MeO-PEG), make the surface more hydrophilic, protein resistant, nontoxic and biocompatible. PEG-based modifications reduce non-specific interactions and have been incorporated into many different products and platforms. This ubiquity is partly due to its chemical abilities and partly due to its ease of manipulation. PEGs are amenable to both two- and three-dimensional situations, affording coverage of material such as porous particles used in SEC. PEG has the chemical and structural properties that most protein resistant materials and molecules share: hydrophilic nature, electrical neutrality, and hydrogen-bond acceptor/donor properties. PEG is known to create a very stable hydration layer due to the spacing between adjacent ethereal oxygen atoms nearly matching water's hydrogen bonding network. See, e.g., Daley et al., *The Journal of Physical Chemistry B* 2017, 121(46), 10574-10582. This hydration layer works to repel non-specific interactions, including ionic and hydrophobic. In addition to surface hydration, PEG chain flexibility is also believed to play a significant role in protein resistance. The best protein resistance ability can be obtained when the surface hydration and steric repulsion of the flexible chains work together (Chen et al., *Polymer* 2010, 51(23), 5283-

5293). Molecular simulations and numerous experimental studies have shown that grafting density, chain length, steric hindrance effects and chain conformation have significant roles on resistance performance. See, e.g., Szleifer, I. *Biophysical Journal* 1997, 72, 595-612; Oelmeier et al., *BMC Biophysics* 2012, 5, 14-26; Bernhard et al., *Physical Chemistry Chemical Physics* 2017, 19, 28182-28188; and Sanchez-Cano, C. et al., *International Journal of Molecular Sciences* 2020, 21, 1007). Although there are different thoughts about the effect of chain length on protein resistance, the reported results and models suggest the importance of high grafting density. Generally, PEG-based modifications provide a more effective resistance against non-specific secondary interactions compared to diol-bonded surfaces. However, the most common PEG-based bonded phases, methoxy-terminated PEGs, when used as the sole surface modification, may cause poor peak shape and low efficiency in SEC.

Surprisingly, it has been discovered according to the present disclosure that modification of porous silica particles with short chain, hydroxy-terminated polyethylene glycol (HO-PEG) bondings allows for greatly decreased secondary interactions with improved peak shape and increased universality of mobile phases, with no negative impact on chromatographic performance for a wide array of possible analytes.

Without wishing to be bound by theory, it is believed that for low molecular weight PEG chains, the PEG chain conformation on the surface depends on both chain length and the termination group of the chain, and the chain conformation difference for the present hydroxy-terminated PEG chains creates a difference in mass transfer and chromatographic performance relative to methoxy-terminated PEG chains.

The present disclosure provides a stationary phase material for size exclusion chromatography. The stationary phase material comprises particles having a hydroxy-terminated polyethylene glycol modified surface. While the hydroxy-terminated polyethylene glycol modified surface provides certain advantages, these advantages may not be realized under all operating conditions. For example, while hydroxy-terminated polyethylene glycol modified wide-pore silica particles of the disclosure in some embodiments demonstrated improved peak shape relative to reference methoxy-terminated polyethylene glycol modified wide-pore silica particles, the hydroxy-terminated polyethylene glycol modified wide-pore silica particles lacked stability under basic conditions, making them potentially less suitable for use with higher pH mobile phases.

However, further modifications to the silica particles according to the present disclosure were found to have surprising advantages. For example, the hydroxy-terminated polyethylene glycol modified silica particles may be further modified with a methoxy-terminated PEG. Such modification can provide certain additional advantages in different operating environments and applications, for example, enhanced stability to alkaline conditions.

The nature of the stationary phase material and surface modifications thereto, is described further herein below.

Particles

The present disclosure provides a stationary phase material for size exclusion chromatography. Such material can be composed of one or more particles (i.e., a "base material"), such as one or more spherical particles. The particles are generally spherical but can be any shape useful in chromatography.

The particles have a particle size or distribution of particle sizes. Particle size may be measured, e.g., using a Beckman Coulter Multisizer 3 instrument as follows. Particles are suspended homogeneously in a 5% lithium chloride methanol solution. A greater than 70,000 particle count may be run using a 30 m aperture in the volume mode for each sample. Using the Coulter principle, volumes of particles are converted to diameter, where a particle diameter is the equivalent spherical diameter, which is the diameter of a sphere whose volume is identical to that of the particle. Particle size can also be determined by light microscopy.

The particles as disclosed herein generally have a size distribution in which the average (mean) diameter is from about 1 to about 50 µm, such as from about 1, about 2, about 5, about 10, or about 20, to about 30, about 40, or about 50 µm. In some embodiments, the particles have a diameter with a mean size distribution from about 1 to about 20 µm. In some embodiments, the particles have a diameter with a mean size distribution from about 1.7 µm to about 5 µm. In some embodiments, the particles have a size distribution in which the average diameter is about 3 µm.

In some embodiments, the particles comprise silica. The particles may be porous or non-porous. In some embodiments, the silica particles are porous, and may be fully porous or superficially porous. Porous materials have a pore size or a distribution of pore sizes. The average pore size (pore diameter) may vary depending on the intended analyte. As described in U.S. Pat. No. 5,861,110, pore diameter can be calculated from 4V/S BET, from pore volume, or from pore surface area.

The pore diameter is generally selected to allow free diffusion of molecules in the analyte and mobile phase so they can interact with the stationary phase. In some embodiments, the porous silica particles have an average pore size from about 0 to about 3000 Å, or from about 40 to about 3000 Å. For example, the average pore size may be from about 40, about 50, about 60, about 70, about 80, about 90, or about 100, to about 200, about 300, about 500, about 600, about 700, about 800, about 900, about 1000, about 2000, or about 3000 Å. In some embodiments, the average pore size is from about 100 to about 300 Å. In some embodiments, the average pore size is about 125 Å. In some embodiments, the average pore size is about 200 Å. In some embodiments, the average pore size is about 250 Å. In some embodiments, the average pore size is about 270 Å. In some embodiments, the average pore size is about 900 Å. In some embodiments, the average pore size is from about 1000 to about 3000 Å, or from about 1000 to about 2000 Å. In some embodiments, the average pore size is about 1000 Å. In some embodiments, the average pore size is about 2000 Å.

The porous silica particles have a surface, and at least some substantial portion of the surface is modified with a hydroxy-terminated polyethylene glycol. The coverage density of the hydroxy-terminated polyethylene glycol on the surface of the modified porous silica particles may vary. For example, in some embodiments, the hydroxy-terminated polyethylene glycol modifier is present on the surface of the porous silica particles at a density from about 0.5 to about 15 µmol/m². In some embodiments, the hydroxy-terminated polyethylene glycol modifier is present on the surface of the porous silica particles at a density from about 0.5 to about 5 µmol/m²' or from about 1 to about 2.0 µmol/m².

In some embodiments, the hydroxy-terminated polyethylene glycol has the formula:

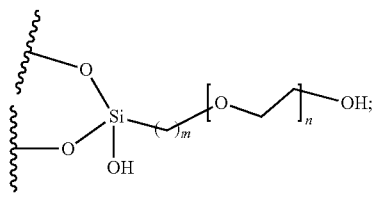

wherein:
m is an integer from about 1 to about 10;
n is an integer from about 2 to about 50; and
wherein the wavy lines indicate points of attachment to the surface of the porous silica particles.

Without wishing to be bound by theory, it is believed that the chain conformation of the polyethylene glycol unit on the surface depends at least partially on chain length.

In some embodiments, m is 1, 2, 3, 4, 5, 6, 7, 8, 9, or 10. In some embodiments, m is 2 or 3. In some embodiments, m is 3 (i.e., propyl).

In some embodiments, n is from about 2, about 5, about 10, about 15, or about 20, to about 25, about 30, about 35, about 40, about 45, or about 50. In some embodiments, n is from about 5 to about 15. In some embodiments, n is from about 8 to about 12. In particular embodiments, m is 3, and n is from about 8 to about 12. In some embodiments, n is an average value representing a mixture of different polyethylene glycol chain lengths. For example, in some embodiments, n may be 8 to 12, meaning the average distribution of chain lengths falls between 8 and 12 polyethylene glycol units. Such embodiments reflect the average chain length distribution in e.g., a commercially available trialkoxysilylalkyl polyethylene glycol useful in embodiments of the disclosure as a surface modifying reagent. In other embodiments, n may be a specific value, such as from about 8, about 9, or about 10, to about 11, or about 12.

In some embodiments, the hydroxy-terminated polyethylene glycol is bifunctional, forming a bridging ("bridged") polyethylene glycol when attached to the surface of the porous particle. In some embodiments, the bridging polyethylene glycol comprises a polyethylene glycol unit and further comprises two alkyl moieties, each having an exposed hydroxy group. In such embodiments, the exposed hydroxy group is the hydroxy termination of the hydroxy-terminated polyethylene glycol. In some embodiments, the bridged polyethylene glycol has the formula:

wherein the wavy lines indicate points of attachment to the surface of the porous silica particles, and m and n are each as defined above. In such embodiments, the modifier is a bis-(silylalkyl-2-hydroxy-alkoxy)polyethylene glycol. In some embodiments, m is 3, and n is 5 to 8.

In some embodiments, the hydroxy-terminated polyethylene glycol is attached directly to hydroxy groups on the initial surface (i.e., the native or as synthesized surface) of the porous silica particles. By initial surface, it is meant that the porous particle has not been treated with any coatings or bondings, and is in the native state as prepared. In such embodiments, the surface, following reaction with the hydroxy-terminated polyethylene glycol reagent, may be described as a bonded surface. A non-limiting depiction of a hydroxy-terminated polyethylene glycol bonded particle (1) is illustrated below:

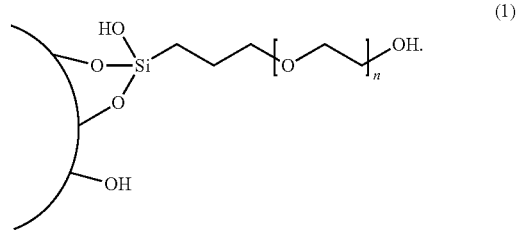

In other embodiments, the native or as synthesized surface is modified with a coating layer, either prior to or simultaneously with attachment of the hydroxy-terminated polyethylene glycol. In such embodiments, the hydroxy-terminated polyethylene glycol is attached through a complex network of silicon and oxygen bonds to the native surface of the porous silica particles.

In some embodiments, the hydroxy-terminated polyethylene glycol reagent is partially polymerized through hydrolytic condensation with itself, or with TEOS, prior to reaction with hydroxyl groups on the initial surface of the porous particle. In such embodiments, the resulting surface modified particle may be described as having a hydroxy-terminated polyethylene glycol coated surface. A non-limiting depiction of a hydroxy-terminated polyethylene glycol coated particle (2) is illustrated below:

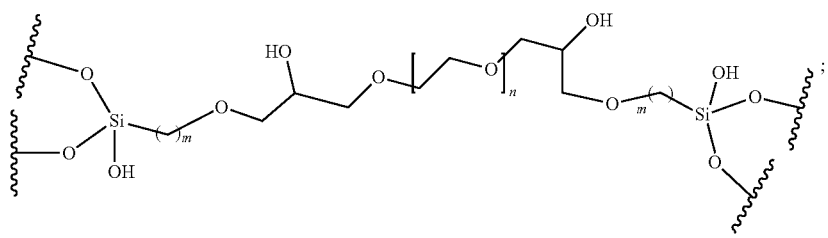

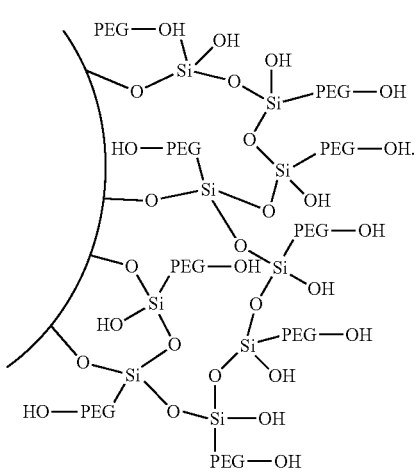

(2)

A non-limiting depiction of a hydroxy-terminated polyethylene glycol/TEOS coated particle (3) is illustrated below:

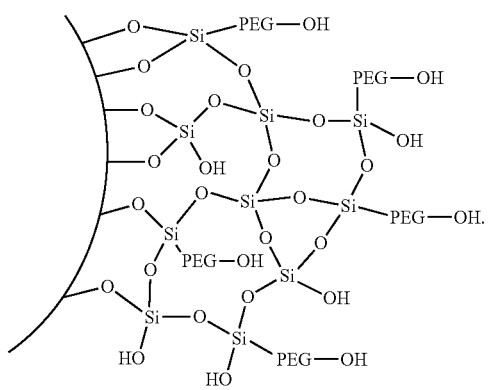

(3)

In some embodiments, the initial surface of the porous particle is coated with a silane reagent to form a secondary surface of oligomeric and/or polymeric siloxane multilayers on the particles. Such oligomeric and/or polymeric siloxane multilayers include those resulting from reaction of the particle surface with, for example, 1,2-bis(triethoxysilane) ethane (BTEE), tetraethyl orthosilicate (TEOS), or partial hydrolytic condensation products of BTEE and TEOS. The hydroxy-terminated polyethylene glycol reagent is then bonded on the coated surface. A non-limiting depiction of a hydroxy-terminated polyethylene glycol bonded and BTEE/TEOS coated particle (4) is illustrated below:

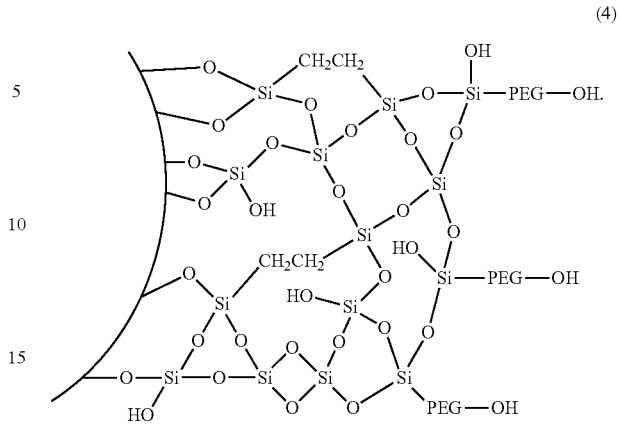

(4)

In some embodiments, the porous silica particles modified with a hydroxy-terminated polyethylene glycol further comprise a surface coating derived from reaction of the porous particle surface with BTEE, TEOS, or a partial hydrolytic condensation product of BTEE and TEOS.

In some embodiments, the porous silica particles comprise a surface coating derived from reaction of the porous particle surface with a partial hydrolytic condensation product of a hydroxy-terminated polyethylene glycol reagent, a partial hydrolytic condensation product of a hydroxy-terminated polyethylene glycol reagent with TEOS, or a combination thereof.

In some embodiments, the porous silica particles comprise or further comprise a surface coating derived from reaction of the porous particle surface with a partial hydrolytic condensation product of a polyethylene glycol silane reagent, a partial hydrolytic condensation product of a polyethylene glycol silane reagent with TEOS, or a combination thereof. Suitable polyethylene glycol-based reagents include, but are not limited to, bridging polyethylene glycol-based reagents as discussed above, and polyethylene glycol-based reagents having a masked or protected hydroxy group. In some embodiments, the hydroxy group may be terminal or may be otherwise attached to the backbone of the reagent (e.g., an exposed hydroxy group on the carbon chain). In some embodiments wherein the hydroxy group is masked or protected, the masking or protecting group may be removed prior to performing chromatography with the particles having a surface modified with such reagents (i.e., providing the exposed or terminal hydroxy group). One of skill in the art will recognize such protecting groups and understand how to either maintain or remove them using standard chemical conditions known to one of skill in the art. A non-limiting set of suitable polyethylene glycol based silane reagents which may be used in addition to, or as an alternative to, the hydroxy-terminated polyethylene glycol reagent described herein above is provided in Table 1.

TABLE 1

Example additional or alternative polyethylene glycol silane reagents 4,4,19,19-Tetraethoxy-3,7,10,13,16,20-hexaoxa-4,19-disiladocosane
Bis(3-triethoxysilylpropyl)polyethylene oxide (25-30 EO)
N,N'-Bis-[(3-triethoxysilylpropyl)aminocarbonyl]polyethylene oxide (10-15 EO)
4,4,19,19-Tetraethoxy-3,7,10,13,16,20-hexaoxa-4,19-disiladocosane
Poly(ethylene oxide), bis(trimethoxysilylpropyl) terminated
Poly(ethylene oxide), bis(triethoxysilylpropyl) terminated

TABLE 1-continued

| Example additional or alternative polyethylene glycol silane reagents |
| --- |
| 2-Propenoic acid, 2-methyl-, 2-[2-[3-(trichlorosilyl)propoxy]ethoxy]ethyl ester |
| 2-Propenoic acid, 2-methyl-, 9,9-dimethoxy-3,6,10-trioxa-9-silaundec-1-yl ester |
| 2-[3-(Dimethoxymethylsilyl)propoxy]ethyl 2-methyl-2-propenoate |
| 2-Propenoic acid, 2-methyl-, 10,10-dimethoxy-3,6,11-trioxa-10-siladodec-1-yl ester |
| 2-Propenoic acid, 2-methyl-, 2-[3-(chlorodimethylsilyl)propoxy]ethyl ester |
| 2-Propenoic acid, 2-methyl-, 2-[3-(chlorodipropylsilyl)propoxy]ethyl ester |
| 2-Propenoic acid, 2-methyl-, 2-[3-(diethoxyethylsilyl)propoxyethyl ester |
| 5,8,11-Trioxa-1-silatridecan-13-ol, 1,1,1-trichloro-, acetate |
| Ethanol, 2-[(chlorodimethylsilyl)methoxy]-, 1-acetate |
| 2,7,10,13-Tetraoxa-3-silapentadecan-15-ol, 3-methoxy-3-methyl-, acetate |
| 6,9,12,15,18,21-Hexaoxa-2-silatricosan-23-ol, 2-chloro-2-methyl-, acetate |
| Triethoxysilylpropoxy(Polyethyleneoxy) Dodecanoate |
| 2-[(Acetoxy(polyethyleneoxy)propyl]triethoxysilane |

In some embodiments, the porous silica particles having a hydroxy-terminated polyethylene glycol modified surface further comprise a surface bonding or coating derived from reaction of the hydroxy-terminated polyethylene glycol modified porous silica particles with a non hydroxy-terminated polyethylene glycol reagent. In some embodiments, the reagent is selected from Table 1. In some embodiments, the reagent is 2-[methoxy(polyethyleneoxy)$_{6-9}$propyl]trichlorosilane or 2-[methoxy(polyethyleneoxy)$_{6-9}$propyl]tris(dimethylamino)silane.

In some embodiments, the porous silica particles having a hydroxy-terminated polyethylene glycol modified surface are hydroxy-terminated polyethylene glycol bonded. In some embodiments, the porous silica particles having a hydroxy-terminated polyethylene glycol modified surface are hydroxy-terminated polyethylene glycol coated. In some embodiments, the porous silica particles having a hydroxy-terminated polyethylene glycol modified surface are hydroxy-terminated polyethylene glycol/TEOS coated. In some embodiments, the porous silica particles having a hydroxy-terminated polyethylene glycol modified surface are hydroxy-terminated polyethylene glycol bonded on a BTEE/TEOS coating.

In any of these embodiments, the porous particle so modified may further comprise a methoxy-terminated polyethylene glycol surface modification (e.g., bonding). Non-limiting cartoon illustrations representative of possible configurations of such bonding and coating arrangements are provided below as structures 4, 5, 6, and 7 As one of skill in the art will recognize, such structures will possess a very complex network of silicon and oxygen bonds which cannot be adequately represented structurally. Accordingly, structures 4, 5, 6, and 7 are provided merely to illustrate the general concept of the coating and bonding combinations disclosed herein. Structure 4 is representative of a hydroxy-terminated polyethylene glycol bonded BTEE/TEOS coated porous particle surface, as described herein above. Structure 5 is representative of a methoxy-terminated polyethylene glycol bonded and hydroxy-terminated polyethylene glycol coated porous particle surface. Structure 6 is representative of a methoxy-terminated polyethylene glycol bonded and hydroxy-terminated polyethylene glycol/TEOS coated porous particle surface. Structure 7 is representative of a porous particle surface which has been hydroxy-terminated polyethylene glycol bonded and further surface modified with a methoxy-terminated polyethylene glycol.

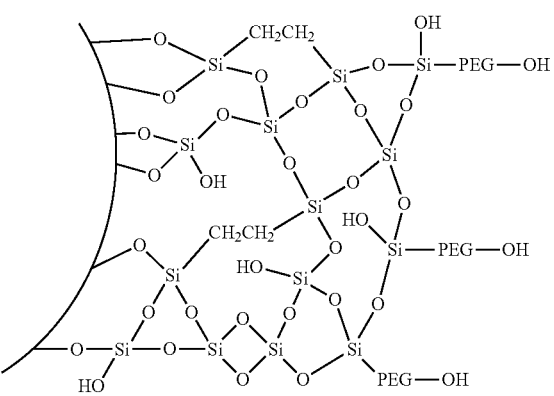

(4)

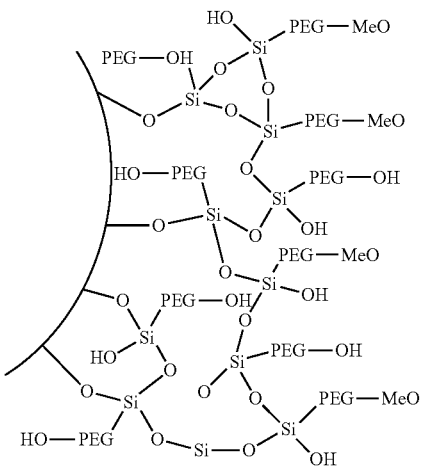

(5)

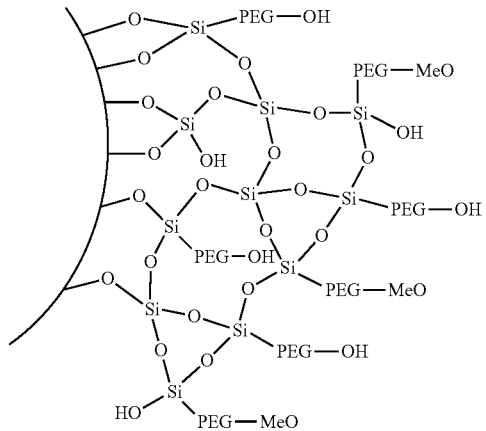

(6)

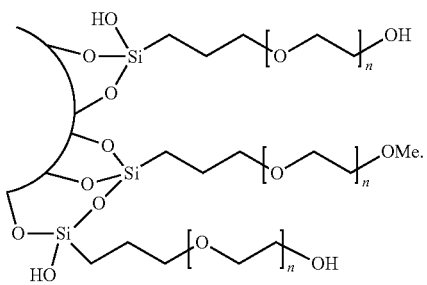

(7)

In particular embodiments, the porous silica particles are hydroxy-terminated polyethylene glycol bonded, hydroxy-terminated polyethylene glycol coated, or hydroxy-terminated polyethylene glycol bonded and BTEE/TEOS coated, and are further surface modified with a methoxy-terminated polyethylene glycol reagent. Accordingly, in some embodiments, the porous silica particles are hydroxy-terminated polyethylene glycol bonded, hydroxy-terminated polyethylene glycol coated, or hydroxy-terminated polyethylene glycol bonded and BTEE/TEOS coated, and are further methoxy-terminated PEG modified.

In some embodiments, the methoxy-terminated PEG modifying reagent is a methoxy-terminated polyethylene glycol silane reagent. In some embodiments, the methoxy-terminated polyethylene glycol silane reagent has a formula

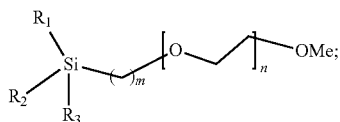

wherein:
at least one of $R_1$, $R_2$, and $R_3$ is OMe, OEt, Cl, or $N(CH_3)_2$;
m is an integer from about 1 to about 10; and
n is an integer from about 2 to about 20.

In some embodiments, m is 1, 2, 3, 4, 5, 6, 7, 8, 9, or 10. In some embodiments, m is 2 or 3. In some embodiments, m is 3 (i.e., propyl).

In some embodiments, n is from about 5 to about 15. In some embodiments, n is from about 6 to about 12, such as from about 6 to about 9.

In some embodiments, the methoxy-terminated PEG modifying reagent is 2-[methoxy(polyethyleneoxy)$_{6-9}$propyl]trichlorosilane or 2-[methoxy(polyethyleneoxy)$_{6-9}$propyl]tris(dimethylamino)silane. Without wishing to be bound by any particular theory, it is believed that further modifying the hydroxy-terminated polyethylene glycol bonded, hydroxy-terminated polyethylene glycol coated, or hydroxy-terminated polyethylene glycol bonded and BTEE/TEOS coated silica particles with a methoxy-terminated polyethylene glycol reagent enhances stability of the porous silica particles to alkaline conditions (e.g., pH values above 7, such as about 8, about 9, or even about 10).

Figure 3B:
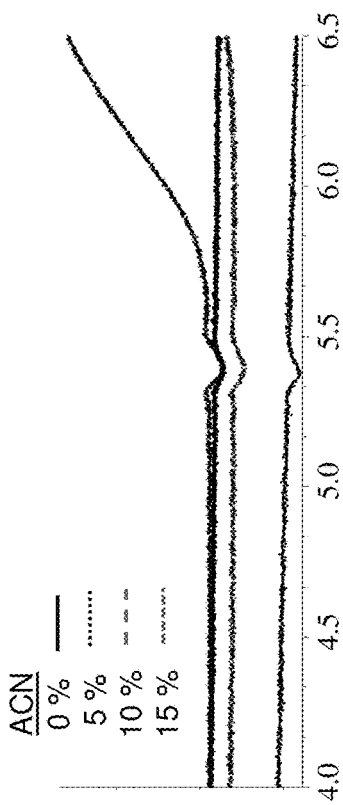
FIG. 3B depicts exemplary chromatographic separations of Trastuzumab emtansine (Kadcyla; Genentech) on a prototype hydroxy-terminated polyethylene glycol (PEG) surface modified 2000 Å silica particle SEC column, with a mobile phase comprising aqueous sodium phosphate buffer and varying concentrations of acetonitrile.
Figure 3C:
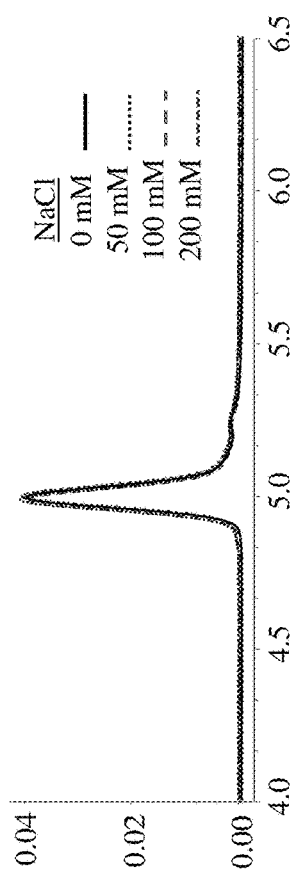
FIG. 3C depicts exemplary chromatographic separations of NISTmAb on a prototype hydroxy-terminated polyethylene glycol (PEG) surface modified 2000 Å silica particle SEC column after high pH application, with a mobile phase comprising aqueous sodium phosphate buffer and varying concentrations of sodium chloride.
Figure 3D:
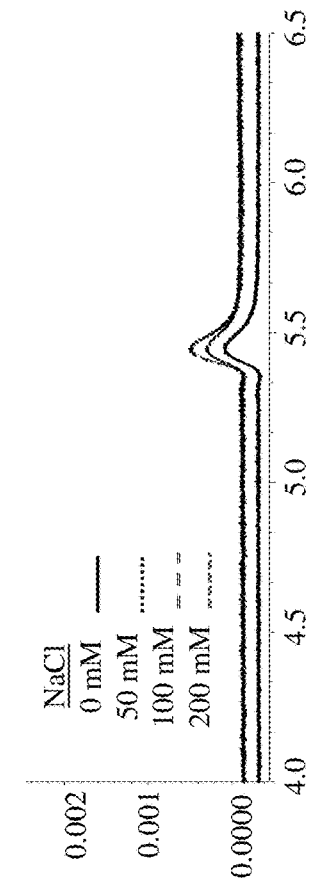
FIG. 3D depicts exemplary chromatographic separations of Trastuzumab emtansine (Kadcyla; Genentech) on a prototype hydroxy-terminated polyethylene glycol (PEG) surface modified 2000 Å silica particle SEC column after high pH application, with a mobile phase comprising aqueous sodium phosphate buffer and varying concentrations of acetonitrile.

As demonstrated herein, porous silica particles having a hydroxy-terminated polyethylene glycol bonding alone exhibited excellent peak shape (much better than a reference methoxy-terminated PEG bonded silica); however, after exposure to basic conditions (pH of 8.5 at 40° C.), the peak shape degraded significantly in subsequent lower-pH separations (Example 11; FIGS. 3C and 3D vs. FIGS. 3A and 3B). Similarly, silica particles having a BTEE/TEOS coating and a hydroxy-terminated polyethylene glycol bonding alone (i.e., silica particles with an inorganic-organic hybrid material coating, such as an ethylene-bridged hybrid material coating and a hydroxy-terminated polyethylene glycol bonding) exhibited excellent peak shape (again, much better than a reference methoxy-terminated PEG bonded silica), but after exposure to basic conditions (pH of 8.5), the peak shape in subsequent lower-pH separations had deteriorated (Example 12; FIGS. 4C and 4D vs. FIGS. 4A and 4B). The peak shape was not as compromised as for the silica particles with hydroxy-terminated polyethylene glycol bonding alone (FIGS. 4C and 4D vs. FIGS. 3C and 3D), but the compromised peak shape is indicative of susceptibility of the stationary phase material to degradation under certain conditions.

Figure 5A:
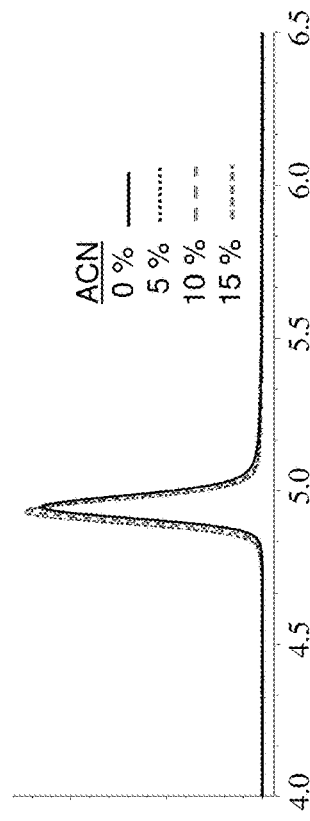
FIG. 5A depicts exemplary chromatographic separations of NISTmAb on a prototype hydroxy-terminated PEG-bonded/methoxy-terminated PEG-modified, 2000 Å silica SEC column, with a mobile phase comprising aqueous sodium phosphate buffer and varying concentrations of sodium chloride.
Figure 5B:
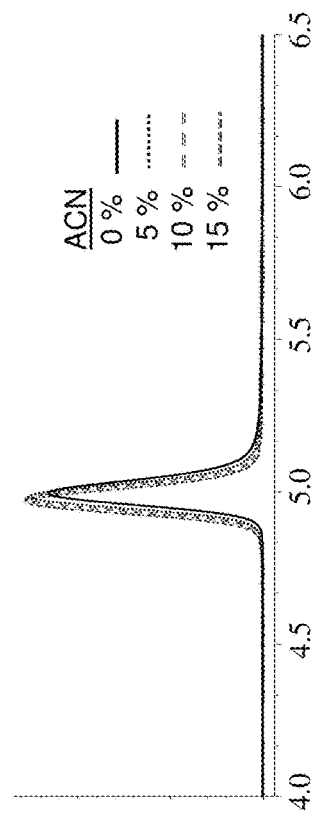
FIG. 5B depicts exemplary chromatographic separations of Trastuzumab emtansine (Kadcyla; Genentech) on a prototype hydroxy-terminated PEG-bonded/methoxy-terminated PEG-modified, 2000 Å silica SEC column, with a mobile phase comprising aqueous sodium phosphate buffer and varying concentrations of sodium chloride.
Figure 5C:
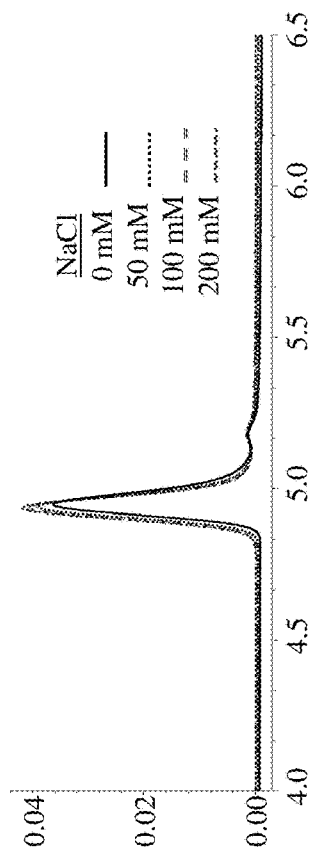
FIG. 5C depicts exemplary chromatographic separations of NISTmAb on a prototype hydroxy-terminated PEG-bonded/methoxy-terminated PEG-modified, 2000 Å silica SEC column after high pH application, with a mobile phase comprising aqueous sodium phosphate buffer and varying concentrations of sodium chloride.
Figure 5D:
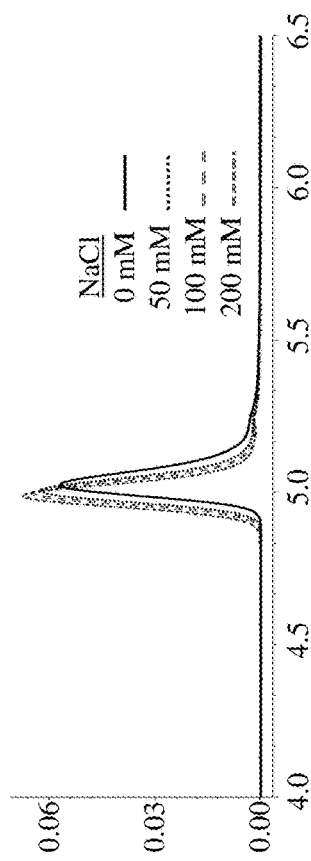
FIG. 5D depicts exemplary chromatographic separations of Trastuzumab emtansine (Kadcyla; Genentech) on a prototype hydroxy-terminated PEG-bonded/methoxy-terminated PEG-modified, 2000 Å silica SEC column after high pH application, with a mobile phase comprising aqueous sodium phosphate buffer and varying concentrations of sodium chloride.

In contrast, silica particles having a hydroxy-terminated polyethylene glycol bonding, and further modified with a methoxy-terminated polyethylene glycol, exhibited excellent peak shape and also exhibited superior high pH stability. Specifically, with reference to Example 13, the results shown in FIGS. 5A-5D demonstrate that the column of Example 8 (modified with both hydroxy- and methoxy-terminated PEG) showed outstanding high pH stability (e.g., there was no significant difference in the chromatographic results for the NISTmAb and Kadcyla analytes both before and after high pH application; FIG. 5A and FIG. 5B vs FIG. 5C and FIG. 5D).

The ratio of hydroxy-terminated polyethylene glycol groups to methoxy-terminated polyethylene glycol groups present on the porous silica surface may vary. For example, in some embodiments, the molar ratio is about 2:1, or about 1:1.

Method of Preparing Stationary Phase Material for SEC

The present disclosure provides a simple and versatile method to bond a hydroxy-terminated polyethylene glycol (PEG) layer onto a silica surface with a surprisingly high grafting density of PEG. The method generally comprises allowing the porous silica particles to react with a silylalkyl polyethylene glycol reagent having one or more leaving groups on the silane. Some adjacent vicinal hydroxyl groups on the porous particle surface are at a distance such that difunctional reactions can occur between the vicinal hydroxyls and a difunctional or trifunctional reagent. When the adjacent hydroxyls on the surface are not suitably spaced for a difunctional reaction, then only a monofunctional reaction takes place.

The reaction is generally conducted according to standard methods, for example, by reaction of the porous silica particles with the appropriate reagent in an organic solvent under reflux conditions. An organic solvent such as toluene is typically used for this reaction.

In some embodiments, the method comprises: providing a stationary phase material comprising porous particles comprising silica (or a silica particles which has been coated with an inorganic/organic hybrid material e.g., a BTEE/TEOS partial hydrolytic condensation product); contacting the stationary phase material with a hydroxy-terminated polyethylene glycol reagent; treating the reaction mixture with an aqueous hydrolysis solution to surface modify the porous silica particles; and further treating the stationary phase material with a methoxy-terminated polyethylene glycol reagent. A stationary phase material produced from this method (contacting with a hydroxy-terminated polyethylene glycol reagent; treating with an aqueous hydrolysis solution; and further treating with a methoxy-terminated polyethylene glycol reagent) is within the scope of the present technology. In some embodiments, the stationary phase particles are produced using the above method in which contacting with an hydroxy-terminated polyethylene glycol reagent and treating with an aqueous hydrolysis solution is repeated/conducted for a time period sufficient to build up one or more layers of a coating (i.e., hydroxyl-terminated coating) prior to treating (e.g., bonding) with a methoxy-terminated polyethylene glycol reagent.

While the above method includes contacting with a hydroxy-terminated polyethylene glycol reagent prior to treating with a methoxy-terminated polyethylene glycol reagent, other methods of production are also within the scope of the present disclosure. For example, in some embodiments, the porous silica particles are contacted first with the methoxy-terminated polyethylene glycol reagent followed by reacting with a hydroxy-terminated polyethylene glycol reagent. In other embodiments, it is possible to contact the porous silica particles with both the hydroxy-terminated polyethylene glycol and the methoxy-terminated polyethylene glycol simultaneously or substantially simultaneously.

In some embodiments, the method comprises providing a stationary phase material comprising porous particles comprising silica; contacting the stationary phase material with a hydroxy-terminated polyethylene glycol reagent having the formula:

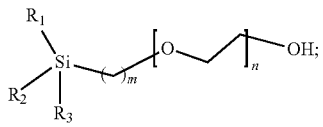

wherein:
at least one of $R_1$, $R_2$, and $R_3$ is OMe, OEt, Cl, or $N(CH_3)_2$;
m is an integer from about 1 to about 10; and
n is an integer from about 2 to about 50, to form a reaction mixture; and
treating the reaction mixture with an aqueous hydrolysis solution to surface modify the porous silica particles.

In some embodiments, $R_1$, $R_2$, and $R_3$ are each OMe, OEt, Cl, or $N(CH_3)_2$. In some embodiments, $R_1$, $R_2$, and $R_3$ are each OMe or are each OEt.

In some embodiments, m is about 3, or is 3.

In some embodiments, n is an average value representing a mixture of different polyethylene glycol chain lengths. For example, in some embodiments, n may be 8 to 12, meaning the average distribution of chain lengths falls between 8 and 12 polyethylene glycol units. In other embodiments, n may be a specific value, such as from about 8, about 9, or about 10, to about 11, or about 12.

In some embodiments, $R_1$, $R_2$, and $R_3$ are each OMe, m is 3, and n is 3. In some embodiments, $R_1$, $R_2$, and $R_3$ are each OMe, m is 3, and n is 8 to 12. In some embodiments, $R_1$, $R_2$, and $R_3$ are each OMe, m is 3, and n is 4.

In some embodiments, the method comprises providing a stationary phase material comprising porous particles comprising silica; contacting the stationary phase material with a bifunctional hydroxy-terminated polyethylene glycol reagent having the formula:

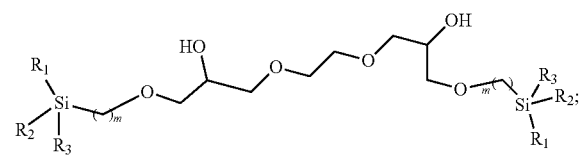

wherein $R_1$, $R_2$, and $R_3$, m, and n are each as defined above.
In some embodiments, m is 3, n is 5 to 8, and $R_1$, $R_2$, and $R_3$ are each OMe or are each OEt.

The amount of the hydroxy-terminated polyethylene glycol reagent utilized may vary depending on the desired surface coverage. In some embodiments, the amount is based on the surface area of the particles. In some embodiments, the amount is from about 1 to about 40 $\mu mol/m^2$.

In some embodiments, a catalyst is added to the reaction mixture to promote reaction between the hydroxyl groups on the porous particle surface and the hydroxy-terminated polyethylene glycol. Without wishing to be bound by theory, it is believed that in the case of less reactive hydroxy-terminated polyethylene glycol based reagents (e.g., trimethoxy or triethoxysilylpropyl polyethylene glycol), the presence of an appropriate catalyst is a determining factor in the extent of reaction and, consequently, the coverage density of the hydroxy-terminated polyethylene glycol modifier on the surface of the porous silica particles. In some embodiments, the catalyst is an organic base such as pyridine or imidazole. In some embodiments, the catalyst is an acid. Particularly suitable catalysts are mineral acids, such as hydrochloric acid (HCl). The amount of catalyst added may vary depending on the particle, modifying reagent, and desired surface coverage. In some embodiments, the amount of catalyst is based on the weight of the porous silica particles. In some embodiments, the amount of catalyst is from about 50 to about 1000 $\mu L/g$ of particles. In some embodiments, the amount of catalyst is about 200 $\mu L/g$ of particles.

Following completion of the reaction with the hydroxy-terminated polyethylene glycol based reagent, the product mixture is generally treated with an aqueous hydrolysis solution to hydrolyze any remaining excess of reagent, and to hydrolyze any remaining alkoxysilyl functionality on the surface modified particles. In some embodiments, the hydrolysis solution is aqueous ammonium acetate. In some embodiments, the hydrolysis solution is aqueous ammonium bicarbonate. The thus-obtained product is then generally washed with water, and acetone and dried at 70° C. under reduced pressure for 16 h.

In some embodiments, the hydroxy-terminated polyethylene glycol reagent is allowed to react with hydroxyl groups on the initial surface of the porous particle. By initial surface, it is meant that the porous particle has not been treated with any coatings or bondings, and is in the native state as prepared. In such embodiments, the surface, following reaction with the hydroxy-terminated polyethylene glycol reagent, may be described as a bonded surface. A non-limiting depiction of a hydroxy-terminated polyethylene glycol bonded particle (1) is illustrated below:

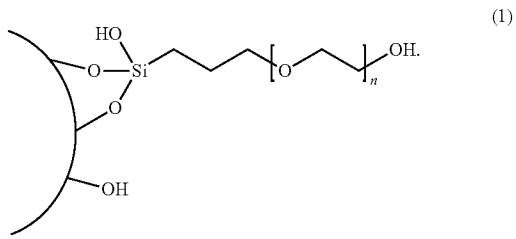

In some embodiments, the method comprises partially polymerizing the hydroxy-terminated polyethylene glycol reagent with itself through hydrolytic condensation prior to reaction with hydroxyl groups on the initial surface of the porous particle. Generally, incomplete (~50%) hydrolytic condensation reaction products may be obtained by reaction of the hydroxy-terminated polyethylene glycol reagent in ethanol (3.1 mol ethanol/mol silane) and 0.1 M HCl (13.5 g/mol silane). In some embodiments, the hydroxy-terminated polyethylene glycol reagent is [hydroxy(polyethyleneoxy)$_{8-12}$propyl]triethoxysilane.

The solution is heated at 70° C. for 18 h under an inert atmosphere. The reaction medium temperature is then increased to 90° C. for atmospheric distillation to strip the ethanol. The temperature is then increased to 100° C. for 1 h under an inert atmosphere. Finally, the reaction medium is cooled to RT and the incomplete condensation reaction product is obtained. The hydroxy-terminated polyethylene glycol reagent is then allowed to react with hydroxy groups on the coated surface.

In some embodiments, the method comprises partially polymerizing the hydroxy-terminated polyethylene glycol reagent with TEOS through hydrolytic condensation prior to reaction with hydroxyl groups on the initial surface of the porous particle. Generally, incomplete (~50%) hydrolytic condensation reaction products may be obtained by reaction of the hydroxy-terminated polyethylene glycol reagent with tetraethoxysilane (TEOS) (1:1 mol/mol) in ethanol (3.1 mol ethanol/mol silane) and 0.1 M HCl (13.5 g/mol silane). In some embodiments, the hydroxy-terminated polyethylene glycol reagent is [hydroxy(polyethyleneoxy)$_{8-12}$propyl]triethoxysilane.

The solution is heated at 70° C. for 18 h under an inert atmosphere. The reaction medium temperature is then increased to 90° C. for atmospheric distillation to strip the ethanol. The temperature is then increased to 100° C. for 1 h under an inert atmosphere. Finally, the reaction medium is cooled to RT and the incomplete condensation reaction product is obtained. The hydroxy-terminated polyethylene glycol reagent is then allowed to react with hydroxy groups on the coated surface.

In each of the above embodiments describing a partial hydrolytic condensation product, the partial hydrolytic condensation product is then allowed to react with the porous particle, which may be a silica particle, or a silica particle which has been coated with e.g., a BTEE/TEOS partial hydrolytic condensation product as described herein. For example, the BTEE/TEOS partial hydrolytic condensation product provides an inorganic/organic hybrid material coating on the silica particle. U.S. Utility application Ser. No. 16/082,823, published as US 2019/0091657A1 on Mar. 28, 2019, describes coating a porous silica particle with an inorganic/organic hybrid material, and is hereby incorporated by reference in its entirety. Generally, the particles are dispersed in a solvent and removing any residual water removed by azeotropic distillation. One suitable non-limiting solvent example is toluene. Generally, the reaction mixture is cooled, for example, to less than about 40° C., and the appropriate partial hydrolytic condensation product is added in an amount of about 1 g per g of particle. A catalyst is then added. In particular embodiments, the catalyst is aqueous ammonium hydroxide (NH$_4$OH) in an amount of about 0.05 g base/g particle. Following completion of reaction, the particles are isolated via filtration, washed and dispersed in a mixture of 70/30 (v/v) water/ethanol (10 mL/g). Ammonium hydroxide (1 g NH$_4$OH/g particle) is added and the mixture is stirred at 50° C. for 2 h. The reaction is then cooled below about 40° C. and the particles isolated via filtration. The isolated particles are washed and dried at 70° C. for 16 h under vacuum. The above process may be repeated as needed.

The modified particles are then exposed to elevated temperatures (100-140° C.) and pH (8-9.8) according to the hydrothermal treatment process described by U.S. Pat. Nos. 6,686,035, 7,223,473, and 7,919,177, each to Jiang) and International Patent Application Publication No. WO2008/103423 to Wyndham. The modified particles are then dispersed in 1.0 M HCl solution (8.4 mL/g particle) and the mixture stirred at 100° C. for 20 h. The reaction is then cooled <40° C. and the particles isolated via filtration. The isolated particles are washed with water until the pH of the filtrate is higher than 5 and then with methanol. Finally, the isolated particles are dried at 70° C. for 16 under vacuum.

In some embodiments, the method comprises first coating (i.e., reacting) the initial surface of the porous particle with a silane reagent to form oligomeric and/or polymeric siloxane multilayers on the particle surface. Suitable silane reagents include 1,2-bis(triethoxysilane)ethane (BTEE), tetraethyl orthosilicate (TEOS), and partial hydrolytic condensation products of BTEE and TEOS. In some embodiments, the silane reagent is BTEE, TEOS, a partial hydrolytic condensation product of BTEE and TEOS, a partial hydrolytic condensation product of a hydroxy-terminated polyethylene glycol reagent, a partial hydrolytic condensation product of a hydroxy-terminated polyethylene glycol reagent with TEOS, or a combination thereof.

Generally, incomplete (~68%) hydrolytic condensation reaction products may be obtained by reaction of the hydroxy-terminated polyethylene glycol reagent with tetraethoxysilane (TEOS) (1:4 mol/mol) in ethanol (3.1 mol ethanol/mol silane) and 0.1 M HCl (19.7 g/mol silane). The solution is heated at 70° C. for 18 h under an inert atmosphere. The reaction medium temperature is then increased to 90° C. for atmospheric distillation to strip the ethanol. The temperature is then increased to 100° C. for 1 h under an inert atmosphere. Finally, the reaction medium is cooled to RT and the incomplete condensation reaction product is obtained.

In some embodiments, the method further comprises reacting a hydroxy-terminated polyethylene glycol modified surface with an additional polyethylene glycol silane reagent. A non-limiting list of suitable example reagents is provided in Table 1. Generally, the method of reacting a hydroxy-terminated polyethylene glycol modified surface with an additional polyethylene glycol silane reagent comprises dispersing the porous silica particles in a solvent and removing any residual water by azeotropic distillation. One suitable non-limiting solvent example is toluene. Generally, the reaction mixture is cooled, for example, to less than about 40° C., and a catalyst is added. In particular embodiments, the catalyst is hydrochloric acid. In some embodiments, HCl is added as a dilute solution, such as 1M or 0.1 M. In some embodiments, the quantity of acid added is about 200 µL/g particle.

Following the catalyst addition, the appropriate silane reagent is added in an amount from about 1 to about 40 µmol/m$^2$. In some embodiments, the additional polyethylene glycol silane is selected from Table 1. In some embodiments, the reagent is a methoxy-terminated polyethylene glycol silane reagent. The reaction is generally stirred for about 5 min and the temperature increased for a period of time (e.g., 110° C. for 20 h). After cooling, the particles are isolated via filtration and washed to remove residual solvent and reagents. The particles are then dispersed in a hydrolysis mixture. In specific embodiments, the mixture comprises acetone and aqueous ammonium acetate. The mixture is generally warmed for a period of time to complete the reaction, following which the particles are isolated by filtration, washed and dried.

In particular embodiments, the porous particles are silica particle having a pore size in a range of about 1000 to about 2000 Å, and are hydroxy-terminated polyethylene glycol bonded, hydroxy-terminated polyethylene glycol coated, or hydroxy-terminated polyethylene glycol bonded and BTEE/TEOS coated, and are further surface modified with a methoxy-terminated polyethylene glycol reagent. Accordingly, in some embodiments, the porous silica particles are hydroxy-terminated polyethylene glycol bonded, hydroxy-terminated polyethylene glycol coated, or hydroxy-terminated polyethylene glycol bonded and BTEE/TEOS coated, and are further methoxy-terminated PEG modified.

In some embodiments, the methoxy-terminated PEG modifying reagent is a methoxy-terminated polyethylene glycol silane reagent. In some embodiments, the methoxy-terminated polyethylene glycol silane has a formula

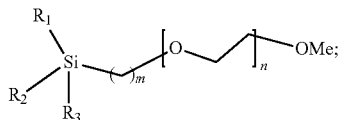

wherein:
at least one of $R_1$, $R_2$, and $R_3$ is OMe, OEt, Cl, or $N(CH_3)_2$;
m is an integer from about 1 to about 10; and
n is an integer from about 2 to about 20.

In some embodiments, m is 1, 2, 3, 4, 5, 6, 7, 8, 9, or 10. In some embodiments, m is 2 or 3. In some embodiments, m is 3 (i.e., propyl).

In some embodiments, n is from about 5 to about 15. In some embodiments, n is from about 6 to about 12, such as from about 6 to about 9.

In some embodiments, the methoxy-terminated PEG modifying reagent is 2-[methoxy(polyethyleneoxy)$_{6-9}$propyl]trichlorosilane or 2-[methoxy(polyethyleneoxy)$_{6-9}$propyl]tris(dimethylamino)silane.

A stationary phase material produced from any of the above methods (such as, e.g., contacting with a hydroxy-terminated polyethylene glycol reagent; treating with an aqueous hydrolysis solution; and further treating with a methoxy-terminated polyethylene glycol reagent) is within the scope of the present technology.

Columns

For use in SEC, generally, the stationary phase will be immobilized in a housing having a wall defining a chamber, for example, a column having an interior for accepting the stationary phase material. Such columns will have a length and a diameter.

In some embodiments, the length of the column is about 300 mm, or about 150 mm. In some embodiments, the length of the column is less than about 300 mm, less than about 150 mm, less than about 100 mm, or less than about 50 mm. In some embodiments, the length of the column is about 50 mm, about 30 mm, about 20 mm, or about 10 mm.

In some embodiments, the column has a bore size of about 4.6 mm inside diameter (i.d.). In some embodiments, the column has a bore size of greater than 4.6 mm i.d. In some embodiments, the column has a bore size of about 7.8 mm i.d. In some embodiments, the column has a bore size of greater than 7.8 mm i.d. In some embodiments, the column has a bore size of greater than about 4 mm i.d., greater than about 5 mm i.d., greater than about 6 mm i.d., or greater than about 7 mm i.d.

Methods of Performing Size Exclusion Chromatography

Disclosed herein is a method for performing size exclusion chromatography (SEC). The method generally comprises contacting a sample containing at least one analyte with an immobilized stationary phase within a column, flowing a mobile phase through the immobilized stationary phase for a period of time, and eluting the at least one analyte from the immobilized stationary phase in said mobile phase.

Typically, methods of performing SEC for separation of proteinaceous analytes utilize a mobile phase comprising a buffer and a salt, and may include mild chaotropes, surfactants, or organic solvents. A mobile phase composition works to keep the analyte in its native form, prevent or reduce aggregation, and yield a quality separation and peak shape. Undesired (e.g., hydrophobic) interactions leading to poor chromatography are generally mitigated through mobile phase optimization, particularly utilizing various salts or organic co-solvents in a variety of concentrations in an attempt to reduce ionic and hydrophobic secondary interactions. However, such optimization is not always straightforward, and increasing the salt concentration or adding organic co-solvents can induce aggregation or denaturation, leading to a decrease in native monomer. Further, the addition of high concentrations of salts can exacerbate hydrophobic interactions. For example, a mobile phase with sufficient ionic strength to ensure analyte stability and solubility can inadvertently cause secondary interactions, leading to poor peak shape and recovery. The problem of hydrophobic interactions can be most easily evidenced when separating analytes with hydrophobic moieties such as antibody drug conjugates (ADCs).

In one aspect is provided a method for performing size exclusion chromatography on a sample containing at least one analyte, the method comprising:
  a. contacting said sample with a column chromatography device comprising a column having an interior for accepting a stationary phase, and an immobilized stationary phase within said interior of the column, wherein the immobilized stationary phase comprises porous silica particles having a diameter with a mean size distribution of between about 1 and about 20 μm; an average pore size from about 40 to about 3000 Å; and wherein said porous silica particles are surface modified with a hydroxy-terminated polyethylene oxide at a surface concentration from about 0.5 to about 5.0 μmoles/m$^2$;
  b. flowing a mobile phase through the immobilized stationary phase for a period of time, the mobile phase comprising water; a buffer; and optionally, an amino acid or derivative thereof; and
  c. eluting the at least one analyte from the immobilized stationary phase in the mobile phase.

Each of the components of the disclosed method are described further herein below.

Analyte

The method for performing size exclusion chromatography as disclosed herein comprises a sample containing at least one analyte. Notably, the utility of the presently disclosed method is not limited to biopharmaceuticals or proteinaceous analytes. In some embodiments, the at least one analyte comprises a small molecule drug, a natural product, or a polymer. In some embodiments, the at least one analyte comprises one or more biomolecules. In some embodiments, the biomolecule is a nucleic acid (e.g., RNA, DNA, oligonucleotide), protein (e.g., fusion protein), peptide, antibody (e.g., monoclonal antibody (mAb)), antibody-drug conjugate (ADC), polysaccharides, virus, virus-like particle, viral vector (e.g., gene therapy viral vector, adeno-associated viral vector), biosimilar, or any combination thereof. In some embodiments, the at least one analyte comprises a nucleic acid, a polysaccharide, a peptide, a polypeptide, a protein, or any combination thereof. In some embodiments, the at least one analyte comprises an adeno-associated virus, an adenovirus, mRNA, DNA, a plasmid, an exosome, an extracellular vesicle, a lipid nanoparticle encapsulated nucleic acid, or a combination thereof.

In some embodiments, the at least one analyte comprises an antibody. In some embodiments, the at least one analyte comprises a monoclonal antibody (mAb). In some embodiments, the at least one analyte comprises a high molecular weight species or aggregate form of an antibody. In some embodiments the at least one analyte is an antibody-drug conjugate.

Mobile Phase

Methods for performing SEC generally comprise flowing a mobile phase through an immobilized stationary phase for a period of time. In certain specific embodiments, the mobile phase and, optionally the sample, are provided by a high performance liquid chromatography (HPLC) system.

A mobile phase composition works to keep the analyte in its native form, prevent or reduce aggregation, and yield a quality separation and peak shape. Undesired (e.g., hydrophobic) interactions leading to poor chromatography are generally mitigated through mobile phase optimization, particularly utilizing various salts or organic co-solvents in a variety of concentrations in an attempt to reduce ionic and hydrophobic secondary interactions. Surprisingly, according to the present disclosure, it has been found that when using the novel hydroxyl-terminated polyethylene glycol surface modified stationary phase materials as disclosed herein, secondary interactions are reduced, simplifying the optimization of mobile phase compositions and providing separations which are less sensitive to changes in mobile phase constituents, pH, temperature, and the like.

Buffer

In some embodiments, the mobile phase comprises a buffer. Buffers serve to control the ionic strength and the pH of the mobile phase. Many different substances may be used as buffers depending on the nature of the analyte. Non-limiting examples of suitable buffers include phosphates, tris(hydroxymethyl)aminomethane, and acetates. In some embodiments, the buffer comprises phosphate. In some embodiments, the buffer comprises acetate. In some embodiments, the buffer is ammonium acetate. In some embodiments, the buffer is an alkali metal phosphate. In some embodiments, the buffer is a sodium or potassium phosphate. In some embodiments, the buffer is sodium phosphate monobasic, sodium phosphate dibasic, or a combination thereof.

The concentration of the buffer may vary depending on the desired pH and ionic strength of the mobile phase. In some embodiments, the buffer is present at a concentration from about 10 to about 100 mM, such as from about 10, about 20, about 20, about 40, or about 50, to about 60, about 70, about 80, about 90, or about 100 mM.

The pH of the mobile phase may vary. In some embodiments, the pH value of the mobile phase is from about 5.0 to about 8.0. In some embodiments, the pH value of the mobile phase is from about 6.0 to about 7.5. In some embodiments, the pH is from about 6.0, or about 6.5, to about 7.0, or about 7.5. In some embodiments, the pH is about 6.0, about 6.1, about 6.2, about 6.3, about 6.4, about 6.5, about 6.6, about 6.7, about 6.8. about 6.9, about 7.0, about 7.1, about 7.2, about 7.3, about 7.4, or about 7.5.

Salts

In some embodiments, the mobile phase comprises a salt. As used herein, the term "salt" refers to an ionic compound comprising an alkali or alkaline earth metal and a halogen (e.g., fluoride, chloride, bromide, iodide). Undesired interactions can be mitigated through utilizing a salt to reduce ionic secondary interactions. However, increasing the salt concentration can induce aggregation and thus lead to a decrease in native monomer, and the addition of high concentrations of salt can exacerbate hydrophobic interactions, and complicates mobile phase optimization. When present, suitable salts include, but are not limited to, sodium chloride and potassium chloride. Suitable concentrations of salts in the mobile phase range from about 10 to about 200 mM. In other embodiments, the mobile phase is free of salts.

Co-Solvents

In some embodiments, the mobile phase comprises an organic co-solvent. Organic co-solvents such as methanol, ethanol, isopropanol or acetonitrile are common additives to SEC mobile phases. However, such co-solvents may result in protein denaturing of proteinaceous analytes. In some embodiments, the mobile phase is free of organic co-solvents. In some embodiments, the mobile phase does not include an organic co-solvent and does not include a salt. In other embodiments, the mobile phase comprises a co-solvent. In the case of PEO modified stationary phase surfaces as described herein, conformational changes of the polymer chains can occur depending on method conditions, which can result in an increase in hydrophobic character of these surfaces. In certain embodiments, for example, in the separation of antibody-drug conjugates, such increased hydrophobic character may result in poor peak shape and reduced resolution. Accordingly, in some embodiments, the mobile phase comprises an organic co-solvent in an amount up to about 15% by volume in the mobile phase. In some embodiments, the co-solvent is acetonitrile. In some embodiments, the co-solvent is isopropanol. In some embodiments, the isopropanol is present in an amount from about 5 to about 15% by volume.

Conditions

Flow Rate

SEC separations using the stationary phase material as disclosed herein may be conducted by flowing the mobile phase through the stationary phase at a variety of different flow rates, which may be determined by one of skill in the art based on scale, stationary phase particle size, difficulty of separation, and the like. In some embodiments, flowing the mobile phase through the immobilized stationary phase is performed at a flow rate from about 0.2 mL/min to about 3 mL/min. In certain embodiments, the flow rate is about 1 mL/min. In some embodiments, the flow rate is about 2 mL/min. In some embodiments, the flow rate is about 3 mL/min. In some embodiments, the flow rate is less than 1 mL/min, such as from about 0.05, about 0.1, about 0.2, about 0.3, about 0.4, or about 0.5, to about 0.6, about 0.7, about 0.8, about 0.9, or about 1 mL/min. In some embodiments, the flow rate is about 0.25, about 0.3, or about 0.35 mL/min.

Temperature

The temperature at which the chromatography is performed (i.e., column temperature) may vary. In some embodiments, the column temperature is from about 20 to about 50° C., such as about 30, about 35, about 40, about 45, or about 50° C. In some embodiments, the method as disclosed herein is insensitive to variations in column temperature, meaning retention time, peak shape and height, and analyte stability are maintained across a range of temperatures (e.g., from about 20 to about 50° C.). In other embodiments, the column temperature is less than about 45° C., less than about 35° C., or less than about 25° C., such as from about 15 to about 25° C., or about 20° C.

Time

The time required for the SEC separation will vary depending on many factors, but will generally be less than about 60 minutes, less than about 50 minutes, less than about 40 minutes, less than about 30 minutes, less than about 20 minutes, less than about 10 minutes, less than about 5 minutes, less than about 4 minutes, less than about 3 minutes, less than about 2 minutes, or less than about 1 minute. In particular, the time will be determined by the elution time of the analyte of interest. In some embodiments, the retention time is reproducible from run to run, and is relatively unaffected by changes in temperature, pH, buffer concentration, and the like.

Detection

Many suitable options exist for methods of detecting the presence of an analyte in the mobile phase exiting from the stationary phase material. In some embodiments, the detector is a refractive index detector, a UV detector, a light-scattering detector, a mass spectrometer, or combinations thereof. In specific embodiments, the detector is a UV detector. Numerous detectors are available; however, a specific detector is a Waters ACQUITY® UPLC® Tunable UV Detector (Waters Corporation, Milford, Mass., USA).

Reduction in Secondary Interactions

The hydroxy-terminated PEG-based surfaces of the present disclosure provide a significant chromatographic performance advantage over methoxy-terminated PEG-based surfaces with respect to reduced secondary interactions (i.e., surface resistance to non-specific adsorption for SEC analytes). The improvements in chromatographic performance may be characterized by an improvement in one or more of peak shape, peak area, peak tailing, analyte recovery, or decreased inter-run variability. Such improvements can be quantified by calculation of factors such as USP tailing and asymmetry @4.4, and width at half height for analyte peaks.

Such improvements are provided without the need for complex mobile phase optimization, which for typical bioanalyses includes modulating pH, ionic strength via salt addition, the addition of chaotropes to reduce aggregation and stabilize protein conformation, and the addition of organic co-solvents. The requirement for individual optimization for each analyte increases the technical difficulty of the separation. Reducing undesired secondary interactions thus increases the value of the separation method. Furthermore, the reduction in mobile phase alterations enables the use of a broader range of detectors. Reduced salt loads, especially non-volatile salts such as potassium or sodium chloride, affords easier hyphenation of mass spectrometers. Also, reducing the salt load decreases the likelihood of particulates, thus orthogonally assisting in keeping the system in prime operating order. Reduced organic cosolvent usage for proteinaceous analytes reduces the chance of irreversible denaturation. Broader pH ranges allow for greater harmony between an analyte's solubility and native structures needs and the mobile phase. This culminates into a much broader applicability.

In some embodiments, a column comprising the stationary phase material as disclosed herein, as compared to a reference column having a stationary phase comprising porous particles which do not have a hydroxy-terminated polyethylene glycol modified surface, provides one or more of:

a reduction in ionic secondary interactions of analytes with the stationary phase material in SEC separations performed on said column;
a reduction in hydrophobic secondary interactions of analytes with the stationary phase material in SEC separations performed on said column;
a reduced dependence on mobile phase pH in SEC separations performed on said column;
a reduced dependence on column temperature in SEC separations performed on said column;
wherein said reductions are determined by an improvement in peak shape as calculated from USP Peak Tailing, Asymmetry @ 4.4, Peak Width @ 50%, or a combination thereof.

In some embodiments, as compared to a reference column having a stationary phase comprising porous particles which do not have a hydroxy-terminated polyethylene glycol modified surface, the column provides enhanced peak resolution in SEC separations performed on said column, enhanced reproducibility of SEC separations performed on said column, or both.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the technology herein has been described with reference to particular embodiments, it is to be understood that these embodiments are merely illustrative of the principles and applications of the present technology. It will be apparent to those skilled in the art that various modifications and variations can be made to the method and apparatus of the present technology without departing from the spirit and scope of the technology. Thus, it is intended that the present technology include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the technology. Thus, the appearances of phrases such as "in one or more embodiments," "in certain embodiments," "in one embodiment" or "in an embodiment" in various places throughout this specification are not necessarily referring to the same embodiment of the technology. Furthermore, the particular features, structures, materials, or characteristics may be combined in any suitable manner in one or more embodiments. Any ranges cited herein are inclusive.

Aspects of the present technology are more fully illustrated with reference to the following examples. Before describing several exemplary embodiments of the technology, it is to be understood that the technology is not limited to the details of construction or process steps set forth in the following description. The technology is capable of other embodiments and of being practiced or being carried out in various ways. The following examples are set forth to illustrate certain aspects of the present technology and are not to be construed as limiting thereof.

EXAMPLES

The present invention may be further illustrated by the following non-limiting examples describing the chromatographic devices and methods.

Materials

All reagents were used as received unless otherwise noted. Those skilled in the art will recognize that equivalents of the following supplies and suppliers exist and, as such, the suppliers listed below are not to be construed as limiting.

The NISTmAb reference standard RM8671, referred to herein as "NISTmAb," was obtained from the National Institute of Standards and Technology (NIST; Gaithersburg, MD). The NISTmAb material is a recombinant humanized IgG1κ expressed in murine suspension culture. It is an ~150 kDa homodimer of two identical light chains and two identical heavy chains linked through both inter- and intra-chain disulfide bonds. A vial of RM 8671 contains 800 μL of 10 mg/mL IgG1κ monoclonal antibody in 12.5 mmol/L L-histidine, 12.5 mmol/L L-histidine HCl (pH 6.0).

Formulated ado-trastuzumab emtasine (Kadcyla, 2 mg/mL) was obtained from Genentech and diluted to 2-5 mg/mL concentration. Kadcyla was chosen due to the difficulty in mobile phase optimization owing to hydrophobic secondary interactions typically encountered in SEC separations.

The silica particles (1000 and 2000 Å) were purchased from Daiso Fine Chem USA, INC (Daisogel; 3848 W Carson Street, Suite 105, Torrance, CA, 90503) and either used as received or treated with a dilute solution of acid (1M HCl, 20 h, 100° C.) before use.

Methods

The surface area (SA), pore volume (PV), and pore diameter (PD) of materials provided herein were measured using the multi-point N sorption method (Micromeritics ASAP 2400; Micromeritics Instruments Inc., Norcross, Ga.). The SA was calculated using the Brunauer-Emmett-Teller (BET) method, the PV was the single point value determined for P/Pd-0.98 to 0.99, and the PD was calculated from the desorption leg of the isotherm using the Barrett, Joyner, and Halenda (BJH) method. For average PD values above 500 Å, the pore diameter and pore volume were measured by mercury porosimetry (Micromeritics AutoPore IV. Micromeritics, Norcross, Ga.). Skeletal densities were measured using a Micromeritics AccuPyc1330 Helium Pycnometer (V2.04N, Norcross, Ga.).

Particle sizes were measured using a Beckman Coulter Multisizer 3 analyzer (Miami, Fla.; 30-um aperture, 70,000 counts). The particle diameter (dp) was measured as the 50% cumulative diameter of the volume-based particle size distribution. The width of the distribution was measured as the 90% cumulative volume diameter divided by the 10% cumulative volume diameter (denoted 90/10 ratio).

The surface coverage was determined by the difference in particle % carbon before and after the surface modification, as measured by elemental analysis. Percent carbon (% C) and percent nitrogen (% N) values were measured by combustion analysis using a LECO TruMac carbon-nitrogen/sulfur Analyzer (Leco Corporation, Michigan, US).

Embodiments of stationary phase materials were prepared as described below in the Examples. The stationary phase materials of Examples 1, 2, 4, 7, and 8 were evaluated for SEC performance and compared against several reference columns (Reference Examples 5 and 6, and several commercial reference columns). Specifically, each column stationary phase material was evaluated for ionic and hydrophobic secondary interactions.

When a protein analyte and the stationary phase carry the same charge, ion-exclusion takes place due to electrostatic repulsion (decrease in protein elution time). When the protein and the stationary phase carry an opposite charge, ion-exchange takes place (increase in elution time). To evaluate such ionic secondary interactions effects, NISTmAb injections were performed in mobile phases with increasing salt concentrations (100 mM sodium phosphate dibasic, pH 6.8, with 0, 50, 100 and 200 mM NaCl) and % change in USP tailing was calculated.

Hydrophobic secondary interactions between the protein and hydrophobic sites on the stationary phase can lead to increased retention and poor peak shape for proteins. To evaluate such hydrophobic secondary interactions effects, antibody-drug conjugate (ADC) injections of Kadcyla were performed in mobile phases with increasing acetonitrile % (100 mM sodium phosphate dibasic, 200 mM NaCl, pH 6.8, with 0, 5, 10 and 15% ACN) and % change in USP tailing was calculated.

All separations were performed using a commercially available high performance liquid chromatography (HPLC) system (ACQUITY® UPLC® H-Class Bio system; available from Waters Corporation, Milford, Mass.). Unless otherwise indicated, separations were performed at a temperature of 30° C. and a flow rate of 0.35 mL/min, with detection by UV absorption at 280 nm.

Stationary Phase Preparation

A series of prototype (Examples 1-4 and 7-8) and reference (Examples 5 and 6) stationary phase materials were prepared having different base particle materials and pore diameters. The base particles, modifications, and surface coverage are summarized below in Table 2.

Example 1. Hydroxy-Terminated PEG, Silica, Average Pore Diameter of 1000 Å

A stationary phase comprising hydroxy-terminated polyethylene glycol (PEG) bonded silica particles was prepared from silica particles having an average particle size of 3 μm and an average pore diameter of 1000 Å. The surface area was 28 m$^2$/g, and the pore volume was 0.82 cm$^3$/g.

The silica particles were bonded to form the hydroxy-terminated PEG bonded stationary phase particles. The silica particles were dispersed in toluene (10 mL/g). The residual water was removed from the material by azeotropic distillation (110° C., 1-2 h). The reaction temperature was reduced below 40° C. and concentrated hydrochloric acid (200 μL/g particles) was added, followed by [hydroxy (polyethyleneoxy)$_{8-12}$propyl]triethoxysilane (30 μmol/m$^2$). The reaction was stirred for 5 min and the temperature was increased to 110° C. for 20 h. The reaction was then cooled to RT and the particles were isolated via filtration. The particles were subsequently washed using the following sequence: 5× toluene, 1× acetone, 4× acetone/water (1:1 v/v), and 2× acetone.

Following the bonding reaction, hydrolysis of remaining ethoxysilyl groups was performed with ammonium acetate or ammonium bicarbonate. The particles were dispersed in a mixture of acetone (8.2 mL/g particle) and 0.12 M ammonium acetate solution (1.8 mL/g particle), and the mixture was stirred at 59° C. for 2 h. The reaction was then cooled <40° C. and the particles were isolated via filtration. The isolated particles were subsequently washed three times with acetone/water (1:1 v/v) and twice with acetone. The isolated, surface modified particles were dried under vacuum at 70° C. for 16 h. The surface coverage of the hydroxy-terminated PEG was 1.46 µmol/m². The hydroxy-terminated PEG bonded stationary phase particles were loaded in a 4.6×150 mm column.

Example 2. Hydroxy-Terminated PEG, Silica, Average Pore Diameter of 2000 Å

A stationary phase comprising hydroxy-terminated polyethylene glycol (PEG) bonded silica particles was prepared from silica particles having an average particle size of 3 µm and an average pore diameter of 2000 Å.

The silica particles were dispersed in toluene (10 mL/g). The residual water was removed from the material by azeotropic distillation (110° C., 1-2 h). The reaction temperature was reduced below 40° C. and concentrated hydrochloric acid (200 µL/g particles) was added, followed by [hydroxy(polyethyleneoxy)$_{8-12}$propyl]triethoxysilane (40 µmol/m²). The reaction was stirred for 5 min and the temperature was increased to 110° C. for 20 h. The reaction was then cooled to RT and the particles were isolated via filtration. The particles were subsequently washed using the following sequence: 5× toluene, 1× acetone, 4× acetone/water (1:1 v/v), and 2× acetone.

Following the bonding reaction, hydrolysis of remaining ethoxysilyl groups was performed with ammonium acetate or ammonium bicarbonate. The particles were dispersed in a mixture of acetone (8.2 mL/g particle) and 0.12 M ammonium acetate solution (1.8 mL/g particle), and the mixture was stirred at 59° C. for 2 h. The reaction was then cooled <40° C. and the particles were isolated via filtration. The isolated particles were subsequently washed three times with acetone/water (1:1 v/v) and twice with acetone. The isolated, surface modified particles were dried under vacuum at 70° C. for 16 h. The surface coverage of the hydroxy-terminated PEG was 1.67 µmol/m². The hydroxy-terminated PEG bonded stationary phase particles were loaded in a 4.6×150 mm column.

Example 3 BTEE/TEOS Coated Silica, Average Pore Diameter of 1000 Å

A silane reagent (3A) was prepared from the incomplete (~68%) hydrolytic condensation of 1,2-bis(triethoxysilane)ethane (BTEE) with tetraethyl orthosilicate (TEOS). To BTEE was added ethanol (3.1 mol ethanol/mol silane reagent), TEOS (1:4 molar ratio with the BTEE) and 0.1 M HCl (19.7 g/mol silane reagent). The solution was heated at 70° C. for 18 h under an inert atmosphere. The reaction temperature was then increased to 90° C. for atmospheric distillation to remove the ethanol. The temperature was then increased to 100° C. for 1 hr under an inert atmosphere. The reaction mixture was cooled to room temperature to obtain the condensation product 3A.

Silica particles having an average particle size of 3 µm and an average pore diameter of 1000 Å were fully dispersed in toluene (21 mL/g of particles). The surface area was 28 m²/g, and the pore volume was 0.82 cm³/g. The residual water was removed from the material by azeotropic distillation (110° C., 1 h). The reaction temperature was held at 40° C. while the silane reagent 3A (1.0 g/g particle) was added and allowed to stir for 10 minutes. Catalytic aqueous NH$_4$OH was added (0.05 g/g particle). The reaction was stirred for an additional 10 minutes at 40° C., then increased to 60° C. for 2 h. The reaction was then cooled to room temperature and the particles were isolated via filtration. The particles were subsequently washed twice with ethanol (10 ml/g) then dispersed in 70/30 (v/v) water/ethanol (10 mL/g). Ammonium hydroxide solution (1 g NH$_4$OH/g particle) was added, and the mixture was stirred at 50° C. for 2 h. The reaction was then cooled <40° C. and the particles were isolated via filtration. The isolated particles were washed (10 ml/g) using the following sequence: 2× methanol/water (1:1 v/v) and 2× methanol. The isolated, surface modified particles were dried at 70° C. for 16 h under vacuum. The process was repeated as needed to achieve the desired concentration of surface modifier.

To ensure uniformity of the hybrid coating layer, the modified particles were exposed to elevated temperatures (100-140° C.) and pH (8-9.8) following the hydrothermal treatment process according to the procedures reported in Jiang (U.S. Pat. Nos. 6,686,035; 7,223,473; and 7,919,177) and Wyndham (International Patent Application Publication No. WO2008/103423).

The modified particles were then dispersed in 1.0 M HCL solution (8.4 mL/g particle) and the mixture was stirred at 100° C. for 20 h. The reaction was then cooled below 40° C. and the particles were isolated via filtration. The isolated particles were washed with water until the pH of the filtrate was higher than 5 and then washed with methanol ×3. The isolated, surface modified particles were dried under vacuum at 70° C. for 16 h.

Example 4. Coated and Bonded Silica, Average Pore Diameter of 1000 Å

Porous coated silica particles prepared according to Example 3 were fully dispersed in toluene (20 mL/g). The residual water was removed from the material by an azeotropic strip (110° C., 3 h). The reaction temperature was cooled below 40° C. and concentrated hydrochloric acid (200 µL/g particle) was added, followed by [hydroxy(polyethyleneoxy)$_{8-12}$propyl]triethoxysilane (30 µmol/m²). The reaction was stirred for 5 min and the temperature was increased to 110° C. for 20 h. The reaction was then cooled to room temperature and the particles were isolated via filtration. The particles were subsequently washed using the following sequence: 5× toluene, 1× acetone, 4× acetone/water (1:1 v/v), and 2× acetone. Following the bonding reaction, hydrolysis of remaining ethoxysilyl groups was performed with ammonium acetate or ammonium bicarbonate. The particles were dispersed in the solution of acetone (8.2 mL/g particle) and 0.12 M ammonium acetate solution (1.8 mL/g particle) and the mixture was stirred at 59° C. for 2 h. The reaction was then cooled below 40° C. and the particles were isolated via filtration. The isolated particles were subsequently washed three times with acetone/water (1:1 v/v) and twice with acetone, then dried at 70° C. for 16 h under vacuum. The surface coverage of the modified particles was 1.41 µmol/m². The hydroxy-terminated PEG bonded stationary phase particles were loaded in a 4.6×150 mm column.

Example 5. Reference Methoxy-Terminated PEG Modified Silica, Average Pore Diameter of 2000 Å

A reference stationary phase comprising methoxy-terminated polyethylene glycol (PEG) bonded silica particles was prepared from silica particles having an average particle size of 3 µm, and an average pore diameter of 2000 Å. The surface area was 14 m²/g, and pore volume was 0.69 cm³/g.

The residual water was removed from the particles by an azeotropic strip (110° C., 3 h). The reaction temperature was cooled below 40° C. and 2-[methoxy(polyethyleneoxy)$_{6-9}$propyl]tris(dimethylamino)silane (40 µmol/m$^2$) was added. The reaction was stirred for 5 min and the temperature was increased to 110° C. for 20 h. The reaction was then cooled to room temperature and the particles were isolated via filtration. The particles were subsequently washed using the following sequence: 7× toluene, 1× acetone, 6× acetone/water (1:1 v/v), and 2× acetone. The particles were then dispersed in the solution of acetone (8.2 mL/g particle) and 0.12 M ammonium acetate solution (1.8 mL/g particle) and the mixture was stirred at 59° C. for 2 h. The reaction was then cooled below 40° C. and the particles were isolated via filtration. The isolated particles were subsequently washed three times with acetone/water (1:1 v/v) and twice with acetone, then dried at 70° C. for 16 h under vacuum. The surface coverage of the modified particles was 2.35 µmol/m$^2$. The methoxy-terminated PEG bonded stationary phase particles were loaded in a 4.6×150 mm column.

Example 6. Reference BTEE/TEOS Coated Silica, Average Pore Diameter of 2000 Å

A silane reagent (6A) was prepared from the incomplete (~68%) hydrolytic condensation of 1,2-bis(triethoxysilane)ethane (BTEE) with tetraethyl orthosilicate (TEOS). To BTEE was added ethanol (3.1 mol ethanol/mol silane reagent), TEOS (1:4 molar ratio with the BTEE) and 0.1 M HCl (19.7 g/mol silane reagent). The solution was heated at 70° C. for 18 h under an inert atmosphere. The reaction temperature was then increased to 90° C. for atmospheric distillation to remove the ethanol. The temperature was then increased to 100° C. for 1 h under an inert atmosphere. The reaction mixture was cooled to room temperature to obtain the condensation product 6A.

Silica particles having an average particle size of 3 µm and an average pore diameter of 2000 Å were fully dispersed in toluene (21 mL/g of particles). The surface area was 14 m$^2$/g, and the pore volume was 0.69 cm$^3$/g. The residual water was removed from the material by azeotropic distillation (110° C., 1 h). The reaction temperature was held at 40° C. while the silane reagent 6A (1.0 g/g particle) was added and allowed to stir for 10 minutes. Catalytic aqueous NH$_4$OH was added (0.05 g/g particle). The reaction was stirred for an additional 10 minutes at 40° C., then increased to 60° C. for 2 h. The reaction was then cooled to room temperature and the particles were isolated via filtration. The particles were subsequently washed twice with ethanol (10 ml/g) then dispersed in 70/30 (v/v) water/ethanol (10 mL/g). Ammonium hydroxide solution (1 g NH$_4$OH/g particle) was added, and the mixture was stirred at 50° C. for 2 h. The reaction was then cooled <40° C. and the particles were isolated via filtration. The isolated particles were washed (10 ml/g) using the following sequence: 2× methanol/water (1:1 v/v) and 2× methanol. The isolated, surface modified particles were dried at 70° C. for 16 h under vacuum. The process was repeated as needed to achieve the desired concentration of surface modifier.

To ensure uniformity of the hybrid coating layer, the modified particles were exposed to elevated temperatures (100-140° C.) and pH (8-9.8) following the hydrothermal treatment process according to the procedures reported in U.S. Pat. Nos. 6,686,035, 7,223,473, and 7,919,177 to Jiang and International Patent Application Publication No. WO2008/103423 to Wyndham.

The modified particles were then dispersed in 1.0 M HCl solution (8.4 mL/g particle) and the mixture was stirred at 100° C. for 20 h. The reaction was then cooled below 40° C. and the particles were isolated via filtration. The isolated particles were washed with water until the pH of the filtrate was higher than 5 and then washed with methanol ×3. The isolated, surface modified particles were dried under vacuum at 70° C. for 16 h. The stationary phase particles were loaded in a 4.6×150 mm column.

Example 7. Coated and Bonded Silica, Average Pore Diameter of 2000 Å

Porous coated particles prepared according to Example 6 were fully dispersed in toluene (10 mL/g). The residual water was removed from the material by azeotropic distillation (110° C., 1-2 h). The reaction temperature was reduced below 40° C. and concentrated hydrochloric acid (200 µL/g particles) was added, followed by [hydroxy(polyethyleneoxy)$_{8-12}$propyl]triethoxysilane (40 µmol/m$^2$). The reaction was stirred for 5 min and the temperature was increased to 110° C. for 20 h. The reaction was then cooled to RT and the particles were isolated via filtration. The particles were subsequently washed using the following sequence: 5× toluene, 1× acetone, 4× acetone/water (1:1 v/v), and 2× acetone.

Following the bonding reaction, hydrolysis of remaining ethoxysilyl groups was performed with ammonium bicarbonate or ammonium acetate. The particles were dispersed in a mixture of acetone (8.2 mL/g particle) and 0.12 M ammonium acetate solution (1.8 mL/g particle), and the mixture was stirred at 59° C. for 2 h. The reaction was then cooled <40° C. and the particles were isolated via filtration. The isolated particles were subsequently washed three times with acetone/water (1:1 v/v) and twice with acetone. The isolated, surface modified particles were dried under vacuum at 70° C. for 16 h. The surface coverage of the hydroxy-terminated PEG was 1.67 µmol/m$^2$. The coated, hydroxy-terminated PEG bonded stationary phase particles were loaded in a 4.6×150 mm column.

Example 8. Hydroxy-Terminated PEG Bonded and MeO-Terminated PEG Modified Silica, Average Pore Diameter of 2000 Å

Porous bonded particles prepared according to Example 2 were fully dispersed in toluene (20 mL/g). The residual water was removed from the material by an azeotropic strip (110° C., 3 h). The reaction temperature was cooled below 40° C. and 2-[methoxy(polyethyleneoxy)$_{6-9}$propyl]tris(dimethylamino)silane (40 µmol/m$^2$) was added. The reaction was stirred for 5 min and the temperature was increased to 110° C. for 20 h. The reaction was then cooled to room temperature and the particles were isolated via filtration. The particles were subsequently washed using the following sequence: 7× toluene, 1× acetone, 6× acetone/water (1:1 v/v), and 2× acetone. The particles were then dispersed in the solution of acetone (8.2 mL/g particle) and 0.12 M ammonium acetate solution (1.8 mL/g particle) and the mixture was stirred at 59° C. for 2 h. The reaction was then cooled below 40° C. and the particles were isolated via filtration. The isolated particles were subsequently washed three times with acetone/water (1:1 v/v) and twice with acetone, then dried at 70° C. for 16 h under vacuum. The surface coverage of the modified particles was 0.83 µmol/ m². The hydroxy-terminated PEG bonded, methoxy-terminated PEG modified stationary phase particles were loaded in a 4.6×150 mm column.

TABLE 2

Stationary phase material properties.

| Example # | Stationary Phase Material | Particle Size (μ) | Pore Diameter (Å) | Surface Modification | Surface Coverage (μmol/m²) |
|---|---|---|---|---|---|
| 1 | Silica | 3.0 | 1000 | HO-PEG(8-12 EO) propyltriethoxysilane bonded | 1.46 |
| 2 | Silica | 3.0 | 2000 | HO-PEG(8-12 EO) propyltriethoxysilane bonded | 1.67 |
| 3 | Silica | 3.0 | 1000 | BTEE/TEOS coated | N/A |
| 4 | Silica | 3.0 | 1000 | BTEE/TEOS coated/ HO-PEG(8-12 EO) propyltriethoxysilane bonded | 1.41 |
| 5 (Ref) | Silica | 3.0 | 2000 | MeO-PEG (6-9 EO) propyltris (dimethylamino) silane bonded | 2.35 |
| 6 (Ref) | Silica | 3.0 | 2000 | BTEE/TEOS coated | N/A |
| 7 | Silica | 3.0 | 2000 | BTEE/TEOS coated/ HO-PEG(8-12 EO) propyltriethoxysilane bonded | 1.21 |
| 8 | Silica | 3.0 | 2000 | HO-PEG(8-12 EO) propyltriethoxysilane bonded/MeO-PEG(6-9 EO)propyltris (dimethylamino) silane modified | 0.83 |

Results

Example 9. NISTmAb and Kadcyla Analytes, Separation on SEC Columns of Example 1, Example 4, and a Reference 1000 Å Silica Column The chromatographic performance of the prototype SEC columns of Examples 1 and 4 were evaluated for NISTmAb and Kadcyla, and compared with the performance of a commercial reference Sepax silica SRT SEC 1000 column (Sepax Technologies, Inc., Newark, Delaware). The mobile phase components comprised 100 mM sodium phosphate dibasic buffer, 200 mM NaCl, 15% aqueous acetonitrile, and water. The mobile phase components were adjusted to provide 0, 50, 100, and 200 mM NaCl concentrations for the ionic interaction test, (NISTmAb) and concentrations of 0, 5, 10, or 15% acetonitrile for the hydrophobic interaction test (Kadcyla), each at a pH of 6.8. The NISTmAb and Kadcyla analytes (1 uL) was injected in the mobile phase.

The results for these experiments (FIGS. 1A-1F) demonstrated that the hydroxy-terminated PEG surface modification was also compatible with wider diameter silica materials. Specifically, the column of Examples 1 and 4 showed dramatic improvement in the SEC of both NISTmAb and Kadcyla when compared to the commercially available Sepax reference column (FIGS. 1A/1D and FIGS. 1B/1E versus FIGS. 1C/1F, respectively). The peak shape results are provided in Table 3, which show that the prototype columns provided narrower Kadcyla peaks with significantly reduced secondary interactions relative to a commercially available reference column with the same pore diameter, but lacking the hydroxy-terminated PEG surface modification.

TABLE 3

Peak shape results for Examples 1 and 4 and a Reference Column.

| Column | NISTmAb % Change in USP Tailing† | Kadcyla % Change in USP Tailing* | Kadcyla, 15% acetonitrile | | |
|---|---|---|---|---|---|
| | | | USP Tailing | Asymmetry @ 4.4 | Width @ 50% |
| Example 1 | −3 | −13 | 1.56 | 2.15 | 0.13 |
| Example 4 | −3 | −17 | 1.48 | 1.98 | 0.13 |
| Reference Sepax SEC1000 | −10 | −126 | 1.57 | 2.11 | 0.29 |

†% change in USP tailing between 0 and 200 mM NaCl
*% change in USP tailing between 0% and 15% acetonitrile Example 10. NISTmAb and Kadcyla Analytes, Separation on SEC Columns of Example 2, a Reference Methoxy-Terminated PEG Modified Silica Column (Example 5), and a Reference 2000 Å Silica Column The chromatographic performance of the prototype SEC column of Example 2 was evaluated for NISTmAb and Kadcyla, and compared with the performance of a reference methoxy-terminated PEG modified silica column (Example 5), and a commercial reference Sepax silica SRT SEC2000 column (Sepax Technologies, Inc., Newark, Delaware). The mobile phase components comprised 100 mM sodium phosphate dibasic buffer, 200 mM NaCl, 15% aqueous acetonitrile, and water. The mobile phase components were adjusted to provide 0, 50, 100, and 200 mM NaCl concentrations for the ionic interaction test, (NISTmAb) and concentrations of 0, 5, 10, or 15% acetonitrile for the hydrophobic interaction test (Kadcyla), each at a pH of 6.8. The NISTmAb and Kadcyla analytes (1 uL) was injected in the mobile phase.

The results for these experiments (FIGS. 2A-2F) demonstrated that the hydroxy-terminated PEG surface modification was also compatible with a wider pore diameter silica material. Specifically, the column of Example 2 showed dramatic improvement in the SEC of both NISTmAb and Kadcyla when compared to the Example 5 reference and the commercially available Sepax reference column (FIGS. 2A and 2D versus FIGS. 2B/2E, and FIGS. 2C/2F, respectively). The peak shape results are provided in Table 4, which show that the prototype column provided narrower Kadcyla peaks with significantly reduced secondary interactions relative to reference columns with the same pore diameter, but lacking the hydroxy-terminated PEG surface modification.

TABLE 4

Peak shape results for Example 2 and Reference Columns.

| Column | NISTmAb % Change in USP Tailing† | Kadcyla % Change in USP Tailing* | Kadcyla, 15% acetonitrile | | |
|---|---|---|---|---|---|
| | | | USP Tailing | Asymmetry @ 4.4 | Width @ 50% |
| Example 2 | −9 | −12 | 1.10 | 1.21 | 0.09 |
| Example 5 (Ref) | −19 | −33 | 1.27 | 1.57 | 0.11 |

TABLE 4-continued

Peak shape results for Example 2 and Reference Columns.

| Column | NISTmAb % Change in USP Tailing[†] | Kadcyla % Change in USP Tailing* | Kadcyla, 15% acetonitrile | | |
|---|---|---|---|---|---|
| | | | USP Tailing | Asymmetry @ 4.4 | Width @ 50% |
| Reference Sepax SEC2000 | −9 | −132 | 1.76 | 2.53 | 0.23 |

[†]% change in USP tailing between 0 and 200 mM NaCl
*% change in USP tailing between 0% and 15% acetonitrile

Example 11. NISTmAb and Kadcyla Analytes, Separation on SEC Column of Example 2 Before and After High pH Application High pH stability of the prototype SEC column of Example 2 was tested by the chromatographic performance evaluation of the column for NISTmAb and Kadcyla before and after a high pH application. The mobile phase components comprised 100 mM sodium phosphate dibasic buffer, 200 mM NaCl, 15% aqueous acetonitrile, and water. The mobile phase components were adjusted to provide 0, 50, 100, and 200 mM NaCl concentrations for the ionic interaction test, (NISTmAb) and concentrations of 0, 5, 10, or 15% acetonitrile for the hydrophobic interaction test (Kadcyla), each at a pH of 6.8. The NISTmAb and Kadcyla analytes (1 uL) were injected in the mobile phase.

The high pH application included 500 injections of a combination sample of thyroglobulin and uracil using a mobile phase of 100 mM ammonium acetate at pH 8.5 at 40° C. The column was conditioned using 10% Acetonitrile/90% 25 mM sodium phosphate pH 7.0+100 mM potassium chloride at 30° C. at the end of high pH application.

The results for these experiments (FIGS. 3A-3D) demonstrated that the column of Example 2 failed at the end of high pH application. Specifically, the chromatographic results for NISTmAb and Kadcyla (FIG. 3A and FIG. 3B) couldn't be obtained after high pH application (FIG. 3C and FIG. 3D).

Example 12. NISTmAb and Kadcyla Analytes, Separation on SEC Column of Example 7 Before and After High pH Application High pH stability of the prototype SEC column of Example 7 was tested by the chromatographic performance evaluation of the column for NISTmAb and Kadcyla before and after a high pH application. The mobile phase components comprised 100 mM sodium phosphate dibasic buffer, 200 mM NaCl, 15% aqueous acetonitrile, and water. The mobile phase components were adjusted to provide 0, 50, 100, and 200 mM NaCl concentrations for the ionic interaction test, (NISTmAb) and concentrations of 0, 5, 10, or 15% acetonitrile for the hydrophobic interaction test (Kadcyla), each at a pH of 6.8. The NISTmAb and Kadcyla analytes (1 uL) were injected in the mobile phase.

The high pH application included 500 injections of a combination sample of thyroglobulin and uracil using a mobile phase of 100 mM ammonium acetate at pH 8.5 at 40° C. The column was conditioned using 10% acetonitrile/90% 25 mM sodium phosphate pH 7.0+100 mM potassium chloride at 30° C. at the end of high pH application.

The results for these experiments (FIGS. 4A-4D) demonstrated that the column of Example 7 showed significant improvement in high pH stability relative to that of Example 2. Specifically, the column of Example 7 showed better performance after high pH application (FIG. 4C and FIG. 4D) compared to the column of Example 6 (FIG. 3C and FIG. 3D). The peak shape results before and after high pH application are provided in Table 5.

TABLE 5

Peak shape results for Example 16 before and after high pH application.

| Column | NISTmAb % Change in USP Tailing[†] | Kadcyla % Change in USP Tailing* | Kadcyla, 15% acetonitrile | | |
|---|---|---|---|---|---|
| | | | USP Tailing | Asymmetry @ 4.4 | Width @ 50% |
| Example 7 before high pH application | −10 | −13 | 1.12 | 1.26 | 0.09 |
| Example 7 after high pH application | −20 | −70 | 1.28 | 1.58 | 0.11 |

[†]% change in USP tailing between 0 and 200 mM NaCl
*% change in USP tailing between 0% and 15% acetonitrile

Example 13. NISTmAb and Kadcyla Analytes, Separation on SEC Column of Example 8, Before and After High pH Application High pH stability of the prototype SEC column of Example 8 was tested by the chromatographic performance evaluation of the column for NISTmAb and Kadcyla before and a after high pH application. The mobile phase components comprised 100 mM sodium phosphate dibasic buffer, 200 mM NaCl, 15% aqueous acetonitrile, and water. The mobile phase components were adjusted to provide 0, 50, 100, and 200 mM NaCl concentrations for the ionic interaction test, (NISTmAb) and concentrations of 0, 5, 10, or 15% acetonitrile for the hydrophobic interaction test (Kadcyla), each at a pH of 6.8. The NISTmAb and Kadcyla analytes (1 uL) was injected in the mobile phase.

The high pH application included 500 injections of a combination sample of thyroglobulin and uracil using the mobile phase of 100 mM ammonium acetate at pH 8.5 at 40° C. The column was conditioned using 10% acetonitrile/90% 25 mM sodium phosphate pH 7.0+100 mM potassium chloride at 30° C. at the end of high pH application.

The results for these experiments (FIGS. 5A-5D) demonstrated that the column of Example 8 showed outstanding high pH stability when compared to the columns of Example 2 and Example 7. Specifically, there was no significant difference in the chromatographic results for NISTmAb and Kadcyla before and after high pH application (FIG. 5A and FIG. 5B vs FIG. 5C and FIG. 5D). The peak shape results before and after high pH application are provided in Table 6.

TABLE 6

Peak shape results for Example 8 before and after high pH application.

| Column | NISTmAb % Change in USP Tailing† | Kadcyla % Change in USP Tailing* | Kadcyla, 15% acetonitrile | | |
|---|---|---|---|---|---|
| | | | USP Tailing | Asymmetry @ 4.4 | Width @ 50% |
| Example 8 before high pH application | −27 | −10 | 1.11 | 1.22 | 0.09 |
| Example 8 after high pH application | −30 | −14 | 1.13 | 1.27 | 0.09 |

†% change in USP tailing between 0 and 200 mM NaCl
*% change in USP tailing between 0% and 15% acetonitrile Results Summary Overall, the prototype hydroxy-terminated PEG columns provided a reduction in ionic and hydrophobic secondary interaction performance. With respect to hydrophobic secondary interactions, the peak shape improvement of Kadcyla was consistent over a pore diameter range of 1000 to 2000 Å on the prototype columns. For each prototype variant (HO-terminated PEG bonded and HO-terminated PEG coated, with and without TEOS, and HO-terminated PEG bonded hybrid BTEE/TEOS coated), SEC performance for Kadcyla was improved relative to commercial columns and reference columns (methoxy-terminated PEG bonded). For wide pore (e.g., 2000 Å) silica particle based columns, it was surprisingly found that further modifying the HO-PEG(8-12 EO)propyltriethoxysilane bonded particles with MeO-PEG (6-9 EO)propyltris(dimethylamino)silane provided outstanding high pH stability relative to columns containing silica particles without the further methoxy-terminated PEG surface modification.

Example 14

Size-based separations are of increasing importance to the emerging field of cell and gene therapy. High resolution, high throughput separations are needed to confirm the potency and safety of candidate therapeutics and vaccines. These advanced therapy medicinal products, as defined by the FDA and EMA, nearly exclusively correspond to large macromolecular complexes greater than 200 Å and sometimes upward of 2000 Å in diameter. It has been standard practice to measure the heterogeneity of these species using analytical ultracentrifugation (AUC). Because of the long turnaround times of producing AUC data, it could be said that the development of new modalities, including AAV and lentiviral vectored gene therapies, adenovirus vectored vaccines, and lipid nanoparticle mRNA, has been hindered. Accordingly, there is a need for size exclusion chromatography (SEC)-based assays that can more rapidly produce a size heterogeneity of these species without compromising the accuracy and fidelity of the measurement. To achieve this goal, high efficiency SEC columns with highly inert surfaces are required.

Adenovirus is approximately 1000 Å in diameter, necessitating the use of wide pore particles and columns for SEC separations. While adeno-associated virus (AAV) is not as large as adenovirus (approximately one third of the size), AAV separations also require special considerations in method development. By virtue of its smaller size, AAV can be separated with a smaller pore size. Nevertheless, highly detailed aggregate information is often sought, and methods to resolve dimeric and trimeric AAV, the diameters of which approach 1000 Å, are therefore desirable. Accordingly, particles with >1000 Å porosity may be advantageous for SEC separation of AAV as they are less likely to filter out large sub-visible aggregates, thereby avoiding bias and providing a more accurate size profile of the sample. Moreover, AAV is often prepared from expression systems that include another larger virus, such as adenovirus or baculovirus. For the detection of these impurities, it is therefore desirable to perform separations with a wide pore SEC particle.

To determine the suitability of columns comprising the particles disclosed herein, an AAV separation was performed. Specifically, a sample (5 μL) of CMV-GFP adeno-associated virus (AAV) serotype 2 ($1\times10^{13}$ genome copy/mL) was size separated on a Waters H-Class Bio system using the column of Example 2, at a flow rate of 0.25 mL/min using a mobile phase comprising 10 mM sodium phosphate pH 7.4 buffer, 3 mM potassium chloride, and 137 mM sodium chloride (phosphate buffered saline). The column temperature was 30° C. Detection was by UV absorbance using an ACQUITY TUV at a wavelength of 280 nm and a scan rate of 10 Hz.

Figure 6:
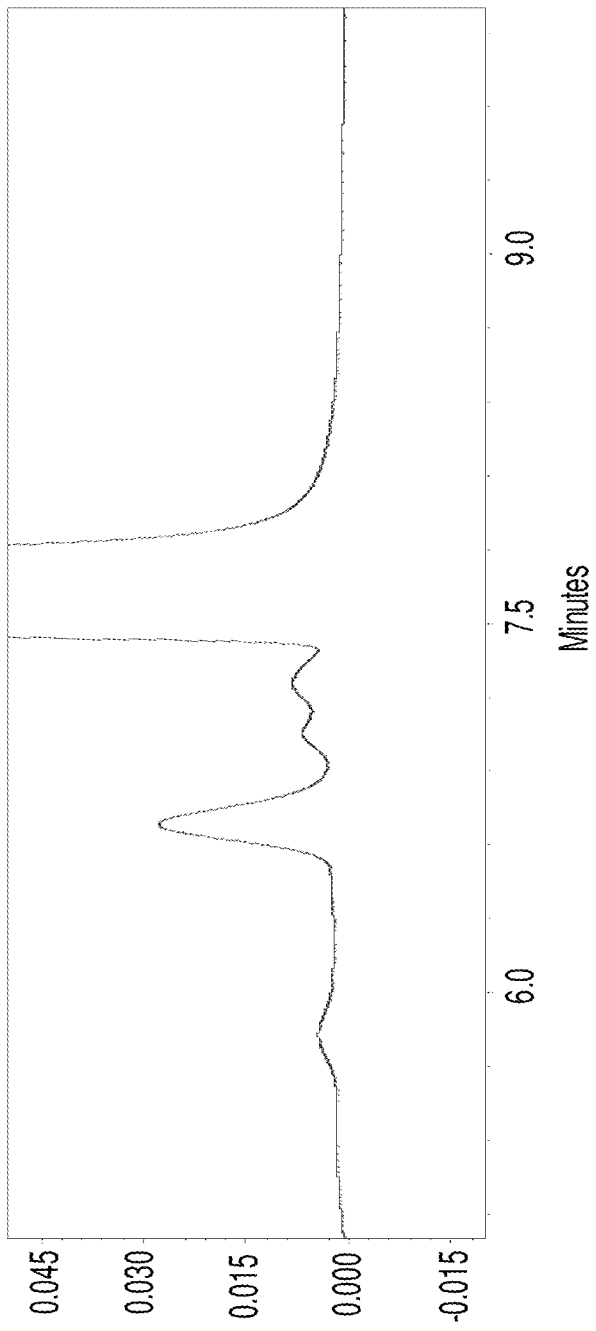
FIG. 6 depicts an exemplary chromatographic separation of adeno associated virus on a prototype SEC column packed with 3 μm particles with an average pore size of 2000 Å, modified at least in part with a OH-terminated polyethylene oxide (PEO) bonding, with a mobile phase comprising 10 mM sodium phosphate buffer, 3 mM potassium chloride, and 137 mM sodium chloride.

A chromatogram illustrating the separation is provided in FIG. 6. The zoomed view illustrates the resolution of species in the high molecular weight elution window. Multiple species were resolved with symmetrical peak shape starting just before 6 minutes and up until the elution of the AAV monomer at approximately 7.5 minutes. Overall, the use of the PEG bonded 3 μm 2000 Å pore size particles was well matched to the use of a simple mobile phase comprising only phosphate buffered saline.

The invention claimed is:

1. A stationary phase material comprising porous silica particles having a surface, wherein at least some substantial portion thereof is modified with a hydroxy-terminated polyethylene glycol, wherein the hydroxy-terminated polyethylene glycol is present on the surface at a density from about 0.5 to about 15 μmol/m², and wherein the surface is further modified with a methoxy-terminated polyethylene glycol.

2. The stationary phase material of claim 1, wherein the porous silica particles have a diameter with a mean size distribution from about 1 to about 50 μm.

3. The stationary phase material of claim 1, wherein the porous silica particles have a diameter with a mean size distribution from about 1 to about 20 μm.

4. The stationary phase material of claim 1, wherein the porous silica particles have a diameter with a mean size distribution from about 1.5 to about 5 μm.

5. The stationary phase material of claim 1, wherein the porous silica particles have an average pore size from about 40 to about 3000 Å.

6. The stationary phase material of claim 1, wherein the porous silica particles have an average pore size from about 1000 to about 3000 Å, or from about 1000 to about 2000 Å.

7. The stationary phase material of claim 1, wherein the hydroxy-terminated polyethylene glycol has a formula

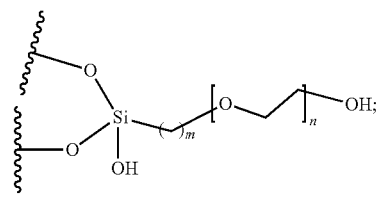

wherein:
    m is an integer from about 1 to about 10;
    n is an integer from about 2 to about 50; and
    wherein the wavy lines indicate points of attachment to the surface of the porous silica particles.

8. The stationary phase material of claim 7, wherein m is 2 or 3.

9. The stationary phase material of claim 7, wherein n is from about 5 to about 15, or from about 8 to about 12.

10. The stationary phase material of claim 7, wherein m is 3 and n is from about 8 to about 12.

11. The stationary phase material of claim 1, wherein the hydroxy-terminated polyethylene glycol is present on the surface of the porous silica particles at a density from about 0.5 to about 5, or from about 1.0 to about 2.0 μmol/m².

12. The stationary phase material of claim 1, wherein the portion of the surface modified with the methoxy-terminated polyethylene glycol is the result of treatment of the stationary phase material with a methoxy-terminated polyethylene glycol reagent having a formula:

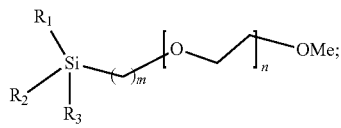

wherein:
    at least one of $R_1$, $R_2$, and $R_3$ is OMe, OEt, Cl, or $N(CH_3)_2$;
    m is an integer from about 1 to about 10; and
    n is an integer from about 2 to about 20.

13. The stationary phase material of claim 12, wherein at least a portion of the surface of the porous silica particles, modified with the hydroxy-terminated polyethylene glycol and the methoxy-terminated polyethylene glycol reagent, comprises a structure represented by one of formulae

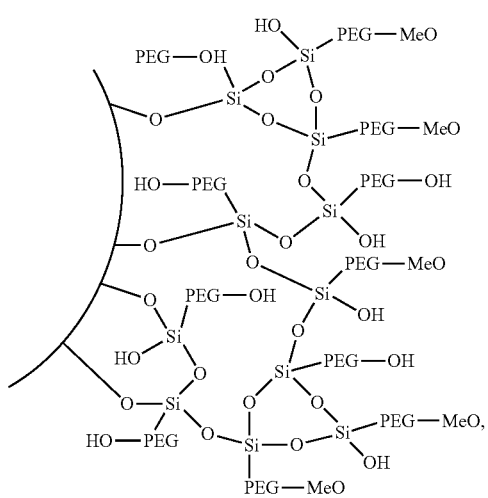

(5)

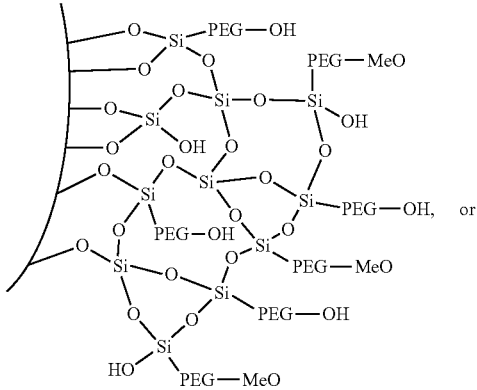

(6)

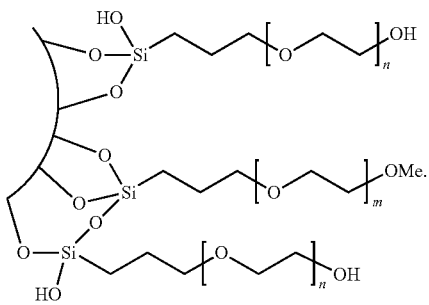

(7)

14. The stationary phase material of claim 13, wherein at least a portion of the surface of the porous silica particles, modified with the hydroxy-terminated polyethylene glycol and the methoxy-terminated polyethylene glycol reagent, comprises a structure represented by the formula:

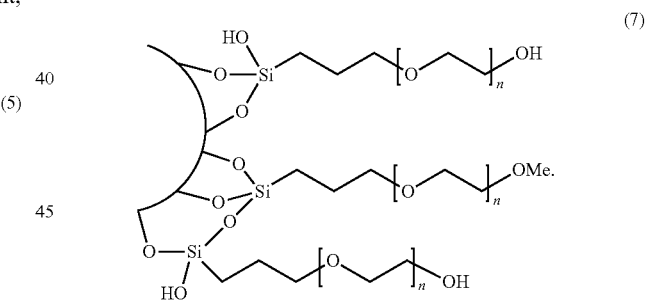

(7)

15. A column comprising the stationary phase material of claim 1, the column having an interior for accepting the stationary phase material.

16. The stationary phase material of claim 1, wherein a molar ratio of the hydroxy-terminated polyethylene glycol to the methoxy-terminated polyethylene glycol is about 2:1.

17. The stationary phase material of claim 1, wherein a molar ratio of the hydroxy-terminated polyethylene glycol to the methoxy-terminated polyethylene glycol is about 1:1.

* * * * *